US009614630B2

(12) United States Patent
Teyeb et al.

(10) Patent No.: US 9,614,630 B2
(45) Date of Patent: Apr. 4, 2017

(54) NETWORK NODE AND A METHOD THEREIN, AND A RADIO BASE STATION AND A METHOD THEREIN FOR PROTECTING CONTROL CHANNELS OF A NEIGHBOURING RADIO BASE STATION

(71) Applicant: Telefonaktiebolaget L M Ericsson (publ), Stockholm (SE)

(72) Inventors: Oumer Teyeb, Solna (SE); Angelo Centonza, Winchester (GB); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/440,758

(22) PCT Filed: Nov. 15, 2012

(86) PCT No.: PCT/SE2012/051262
§ 371 (c)(1),
(2) Date: May 5, 2015

(87) PCT Pub. No.: WO2014/077746
PCT Pub. Date: May 22, 2014

(65) Prior Publication Data
US 2015/0304062 A1    Oct. 22, 2015

(51) Int. Cl.
*H04J 11/00* (2006.01)
*H04W 52/14* (2009.01)
(Continued)

(52) U.S. Cl.
CPC .......... *H04J 11/005* (2013.01); *H04L 5/0073* (2013.01); *H04W 52/143* (2013.01);
(Continued)

(58) Field of Classification Search
CPC . H04L 5/0053; H04L 5/0073; H04L 27/2627; H04W 72/082; H04W 72/042;
(Continued)

(56) References Cited

U.S. PATENT DOCUMENTS

2011/0170496 A1* 7/2011 Fong ............... H04L 5/0053
370/329
2012/0014333 A1* 1/2012 Ji ................... H04L 5/0032
370/329
(Continued)

FOREIGN PATENT DOCUMENTS

WO    2012158959 A1    11/2012

OTHER PUBLICATIONS

Unknown, Author, "ABS Reduced Power in FeICIC", 3GPP TSG-RAN WG3 Meeting #75, R3-120075, Huawei, Dresden, Germany, Feb. 6-10, 2012, 1-3.
(Continued)

Primary Examiner — Michelle M Koeth
(74) Attorney, Agent, or Firm — Murphy, Bilak & Homiller, PLLC

(57) ABSTRACT

A network node and a method performed by a network node for protecting control channels of a neighboring RBS, the network node and the RBS being operable in an OFDM based radio communication network are provided. An RBS and a method performed by an RBS for transmitting control channels to UEs currently being associated with the RBS in an OFDM based radio communication network are also provided. The method in the network node comprises determining (220) at least one subframe out of a predetermined number of subframes in which control channels are to be transmitted with reduced transmission power in relation to a nominal transmission power; and informing (230) the RBS which subframe(s) out of the predetermined number of
(Continued)

subframes in which control channels are to be transmitted with reduced transmission power.

28 Claims, 14 Drawing Sheets

(51) Int. Cl.
| | |
|---|---|
| *H04L 5/00* | (2006.01) |
| *H04W 72/04* | (2009.01) |
| *H04W 52/24* | (2009.01) |
| *H04W 52/32* | (2009.01) |
| *H04W 72/08* | (2009.01) |
| *H04W 52/34* | (2009.01) |
| *H04W 16/10* | (2009.01) |
| *H04L 27/26* | (2006.01) |

(52) U.S. Cl.
CPC ....... *H04W 52/243* (2013.01); *H04W 52/325* (2013.01); *H04W 52/343* (2013.01); *H04W 72/042* (2013.01); *H04W 72/0406* (2013.01); *H04W 72/0473* (2013.01); *H04W 72/082* (2013.01); *H04L 27/2627* (2013.01); *H04W 16/10* (2013.01); *H04W 72/0426* (2013.01); *Y02B 60/50* (2013.01)

(58) Field of Classification Search
CPC ......... H04W 72/0406; H04W 72/0473; H04W 72/1252; H04W 52/244; H04W 52/325; H04W 52/143; H04W 52/245; H04W 36/20; H04W 72/0426; H04W 52/343; H04W 52/243; H04W 16/10; H04J 11/005; Y02B 60/50
See application file for complete search history.

(56) References Cited

U.S. PATENT DOCUMENTS

2013/0250882 A1* 9/2013 Dinan ............... H04W 72/0426
 370/329
2015/0223135 A1* 8/2015 Ratasuk ................ H04W 16/32
 455/436

OTHER PUBLICATIONS

Unknown, Author, "Details of time-domain extension of Rel-8/9 backhaul-based ICIC", 3GPP TSG-RAN WG1 #62bis, R1-105587, Xian, China, Oct. 11-15, 2010, 1-4.
Unknown, Author, "Reduced transmission power ABS concept considerations", 3GPP TSG RAN WG1 #68 Meeting, R1-120713, Nokia Siemens Networks, Nokia, Dresden, Germany, Feb. 6-10, 2012, 1-3.

* cited by examiner

▰ Reference Signals
▨ Control
▱ Data

| Control Channel Protected Pattern | BIT STRING (SIZE(40)) | Each position in the bitmap represents a DL subframe, for which value "1" indicates 'Control Channel protected Subframe' and value "0" indicates 'non Control Channel Protected Subframe'. The first position of the Control Channel Protected Pattern corresponds to subframe 0 in a radio frame where SFN = 0. The control channel protected pattern may be continuously repeated in all radio frames. |
|---|---|---|
| Control Channel Protected Pattern Threshold | ENUMERATED | The threshold in dB indicating the maximum overall control channel transmission power in a subframe indicated with "0" in the Control Channel Protected Pattern Information Element |

Fig. 3a

| Control Channel Interference Overload Indication | ENUMERATED (High interference, Medium interference, Low interference, ...) | Each position in the bitmap represents a DL subframe |
|---|---|---|

Fig. 3b

NETWORK NODE AND A METHOD THEREIN, AND A RADIO BASE STATION AND A METHOD THEREIN FOR PROTECTING CONTROL CHANNELS OF A NEIGHBOURING RADIO BASE STATION

TECHNICAL FIELD

The present disclosure relates to communication in a wireless communication network and in particular to downlink data transmission in a wireless communication network.

BACKGROUND

Wireless communication networks provide a plurality of different services to users. A user typically has a user equipment, UE, e.g. a mobile phone, a laptop, Personal Digital Assistant, PDA or any other type of terminal be which the user makes use of one or more services offered by the wireless communication network.

The wireless communication network may be based on a variety of different technologies both with regards the Radio Access Network, RAN, and also for the Core Network. One example of such a technology is Long Term Evolution, LTE. Transmissions are organised into radio frames of 10 ms, each radio frame consisting of 10 equally sized subframes of 1 ms, as illustrated in FIG. 1a. LTE uses Orthogonal Frequency-Division Multiplexing, OFDM, in the downlink and Discrete Fourier Transform, DFT,-spread OFDM in the uplink. The basic LTE physical communication resources can thus be seen as a time-frequency grid of subframes (time domain) and resource blocks (frequency domain), as illustrated in the example in FIG. 1b, where each resource element corresponds to one subcarrier during one OFDM symbol interval (on a particular antenna port).

The resource allocation in LTE is described in terms of resource blocks, where a resource block corresponds to one slot (0.5 ms) in the time domain and 12 contiguous 15 kHz subcarriers in the frequency domain. Two consecutive resource blocks (in time) represent a resource block pair and correspond to the time interval upon which transmission scheduling operates. Resource blocks are numbered in the frequency domain, starting with 0 from one end of the system bandwidth.

An LTE subframe normally contains 14 OFDM symbols, where the first OFDM symbols, 1, 2 or 3 are used for transmission of physical control channels and the remaining OFDM symbols are used for physical data channel transmissions. In the example illustrated in FIG. 1b, downlink control channels are mapped on the first OFDM symbol only, so in this particular case the mapping of data can start already at the second OFDM symbol, i.e. data can be mapped on 13 OFDM symbols out of 14 (assuming a normal Cyclic Prefix (CP)).

In addition to transmissions of downlink control and data, Common Reference Signals, CRS, are also transmitted. How CRS are transmitted within a subframe is known by the served user equipment, UE, after initial access to the network or if the serving Radio Base Station, RBS, or evolved Node B, eNB, has configured specific measurements on a dedicated subframe pattern for specific cells, for which the subframes are meant to have CRS present in all possible symbols. The CRS is used for channel estimation, as part of demodulation of data and control channels, as well as for mobility and channel quality measurements. LTE also supports demodulation based on user-specific Demodulation Reference Signals, DM-RS, in which some data resources are used for transmitting DM-RS.

In the downlink, physical data is transmitted via the Physical Downlink Shared Channel, PDSCH, and physical control signals are transmitted via three physical control channels: Physical Control Format Indicator Channel, PCFICH, Physical Downlink Control Channel, PDCCH, and Physical Hybrid-ARQ Indicator Channel, PHICH.

The PCFICH carries information about the length of the control region, which can vary dynamically on a subframe basis. After it has been detected, the user equipment knows the length of the control region and thus in which OFDM symbol the data transmission starts. The PCFICH is always transmitted within the first ODFM symbol of the control region at locations in the time-frequency grid that are known by the served UE(s).

The PDCCH carries an assignment, or a grant, to UE(s). After demodulating the PDCCH and receiving the assignment, the UE knows the physical resources containing the data and also how to demodulate the data. In case of demodulating the PDCCH and receiving a grant, the UE knows the resource blocks to transmit the data within and also how the data shall be modulated and transmitted. When to receive an assignment is in general not known in advance so UEs monitor the PDCCH transmissions in all subframes. The time duration of the PDCCH is the same as the length of the control region.

The PHICH carries Hybrid Automatic Repeat request, HARQ, acknowledgement, ACK,/negative acknowledgement, NACK, responses to UEs indicating whether the uplink data transmission in a previous subframe was successfully decoded by the RBS or not. Which physical resources within the control region that carry PHICH are known by UEs after acquiring system information and when to receive a PHICH is given by the time instant of corresponding uplink data transmission. The time duration of the PHICH is either one or three OFDM symbols, depending on the cell configuration. In the case of extended PHICH (i.e. durations of three ODFM symbols), UEs may not need to detect PCFICH to acquire the length of the control region.

The physical downlink control channels are mapped in a cell-specific way on resources in the time-frequency grid that span over the whole system bandwidth whereas data channels can be mapped to an arbitrary number of resource blocks within the system bandwidth. The modulation schemes used for PDSCH transmissions are Quadrature Phase Shift Keying, QPSK, 16 Quadrature Amplitude Modulation, QAM, and 64QAM, whereas physical control channels are always transmitted with QPSK modulation. When CRS are used for demodulation of PDSCH, the transmit power differences between CRS and PDSCH need to be known by the UE when data is modulated with 16QAM and 64QAM.

The LTE system has been developed in such a way that reliable communication is possible even with low signal to interference and noise level ratios (Signal to Interference Noise Ratio, SINR), which makes it possible to deploy networks with a frequency reuse factors of 1 (i.e. neighbouring RBSs or cells using the same frequency). However, a frequency reuse of one still implies that UEs near cell edges or cell borders experience more interference as compared to cell centre UEs. As such, co-ordination of the scheduling between neighbouring cells may be beneficial to ensure that even cell edge UEs will get fair share of the overall cell capacity. For example, neighbouring RBSs can choose to use a frequency reuse of 1 only in their central region and apply scheduling restrictions so that they don't use the same frequency resources in their cell borders, basically creating a partial frequency reuse in the cell border areas.

Inter-cell Interference Co-ordination, ICIC, is a mechanism by which RBSs consider the interference from and to neighbouring RBSs in their scheduling decisions. Since the RBSs are fully responsible for their scheduling decisions for performing scheduling, ICIC requires some messages to communicate scheduling and interference situations between neighbouring RBSs. The messages used may be messages of an X2 interface, or in other words messages comprised in an X2 application protocol, X2-AP.

For ICIC in the UL direction in $3^{rd}$ Generation Partnership Project, 3GPP LTE Release 8, two X2 Information Elements, IEs, are available as part of the X2: LOAD INFORMATION message: UL High Interference Indicator, HII, and UL Interference Overload Indicator, OI. Both OI and HII can be communicated between neighbouring as often as every 20 ms.

The HII is an IE that may be sent by an RBS to its neighbouring RBSs to inform them about the UL Physical Resource Blocks, PRBs, that it is planning to grant to its cell edge UEs in the UL in the near future. The RBSs response to receiving this message is left up to implementation, but one possible reaction could be to refrain for a certain duration from granting the PRBs indicated as interference sensitive in the HII to their cell edge UEs, as those PRBs are expected to experience strong UL interference from the cell edge UEs of the neighbour RBS that sent out the HII message.

The OI is an IE indicating the uplink interference level experienced by a cell on each UL PRBs. Therefore, this IE will typically be sent by an RBS victim of UL interference to an RBS acting as interference aggressor. An aggressor is in this sense an RBS causing interference to a neighbouring RBS, the neighbouring suffering from the interference being the victim. For each PRB, the level of interference can be assigned to low, medium or high. The response to receiving the OI IE is also left up to implementation, but a possible reaction could be for a neighbour RBS to schedule more on the PRBs reported to experience low level of interference and less on the PRBs experiencing high levels of interference until the situation is resolved, for example, neighbour sends out another OI indicating there are few or no PRBs experiencing high interference.

In DL the X2 IE Relative Narrowband Transmit Power, RNTP, indicator has been defined as part of the X2: LOAD INFORMATION message. The RNTP includes a bitmap, where each bit, corresponding to each PRB, indicates whether the RBS is planning to keep the transmit power of the PRB below a certain threshold, known as RNTP threshold, which is also included in the RNTP message. A bitmap value of "0" can be considered as a promise by the RBS not to use a power level higher than the RNTP threshold. The promise is expected to be kept by the cell until a future RNTP message tells otherwise.

The RNTP threshold can take one of these values in dB:

$$RNTP_{threshold} = \{-\infty, -11, -10, -9, -8, -7, -6, -5, -4, -3, -2, -1, 0, +1, +2, +3\}$$

For example, if the RNTP threshold is $-\infty$, this can be considered as a promise by the RBS to its neighbours that it will not transmit any data on all the PRBs flagged with a "0" bitmap. A threshold value of 0 dB means that less than the nominal transmit power will be used on the PRBs flagged with a "0" bitmap, while a threshold value of +3 indicates that the PRBs flagged with a "1" are actually going to use power boosting up to 50% higher than the nominal transmission power for the cell sending the bitmap.

Similar to the reception of the OI and the HII, the RBS's response to RNTP is left up to implementation. One possible reaction could be for the RBS to avoid scheduling cell edge UEs in the DL on those PRBs expected to be allocated high transmission power by the reporting neighbouring RBS, as they are likely to be the ones to be scheduled to the cell edge UEs of the reporting neighbouring RBS.

Thus the RNTP can be considered as the DL equivalent of the UL HII (but with more information, since the HII doesn't provide any thresholds), as it provides the relative interference to be experienced at particular PRBs.

The ICIC mechanisms described in the previous section are all target to the data region only and currently there is no mechanisms standardized for the control region.

SUMMARY

The object is to obviate at least some of the problems outlined above. In particular, it is an object to provide a network node and a method performed by a network node for protecting control channels of a neighbouring RBS, the network node and the RBS being operable in an OFDM based radio communication network. A further object is to provide an RBS and a method performed by an RBS for transmitting control channels to UEs currently being associated with the RBS in an OFDM based radio communication network. These objects and others may be obtained by providing a network node and an RBS and a method in a network node and in an RBS respectively according to the independent claims attached below.

According to an aspect a method performed by a network node for protecting control channels of a neighbouring RBS, the network node and the RBS being operable in an OFDM based radio communication network is provided. The method comprises determining at least one subframe out of a predetermined number of subframes in which control channels are to be transmitted with reduced transmission power in relation to a nominal transmission power; and informing the RBS which subframe(s) out of the predetermined number of subframes in which control channels are to be transmitted with reduced transmission power.

According to an aspect, a method performed by an RBS for transmitting control channels to UEs currently being associated with the RBS in an OFDM based radio communication network is provided. The method comprises receiving information from a network node regarding a number of, and which, subframes out of a predetermined number of subframes in which control channels are to be transmitted with reduced from the network node, and determining at least one UE requiring the control channels to be sent with nominal transmission power. The method further comprises scheduling control channels, for the at least one UE, in subframes in which control channels are to be transmitted with reduced power from the network node.

According to an aspect, a network node adapted for protecting control channels of a neighbouring RBS, the network node and the RBS being adapted to be operable in an OFDM based radio communication network is provided. The network node comprises a determining unit adapted to determine at least one subframe out of a predetermined number of subframes in which control channels are to be transmitted with reduced transmission power in relation to a nominal transmission power. The network node further comprises an informing unit adapted to inform the RBS which subframe(s) out of the predetermined number of subframes in which control channels are to be transmitted with reduced transmission power.

According to an aspect, an RBS adapted for transmitting control channels to UEs currently being associated with the RBS. The RBS is operable in an OFDM based radio communication network. The RBS comprises a receiving unit adapted to receive information from a network node regarding a number of, and which, subframes out of a predetermined number of subframes in which control channels are to be transmitted with reduced from the network node. The RBS further comprises a determining unit adapted to determine at least one UE requiring the control channels to be sent with nominal transmission power, and a scheduling unit adapted to schedule control channels, for the at least one UE, in subframes in which control channels are to be transmitted with reduced power from the network node.

The network node, the RBS and the respective methods therein may have several advantages. For example, mechanisms are provided for control region interference mitigation. Further, the method and/or the network node may be used in conjunction with currently standardised data region interference. Another advantage may be that peer-to-peer signalling may be used which enables full autonomy for the RBS to perform an internal evaluation of the best scheduling strategy for the UE(s). Still, a possible advantage is that the solution is flexible enough to adapt to the variability of the control region duration in each subframe. The solution has no impact on the UEs hence the solution may be employed for all existing UEs.

BRIEF DESCRIPTION OF DRAWINGS

Embodiments will now be described in more detail in relation to the accompanying drawings, in which:

FIG. 3a is an example of a tabular description of Control Channel Protected Pattern and Threshold.

FIG. 3b is an example of a tabular description of Control Channel Interference Overload Indication.

DETAILED DESCRIPTION

Figure 1A:
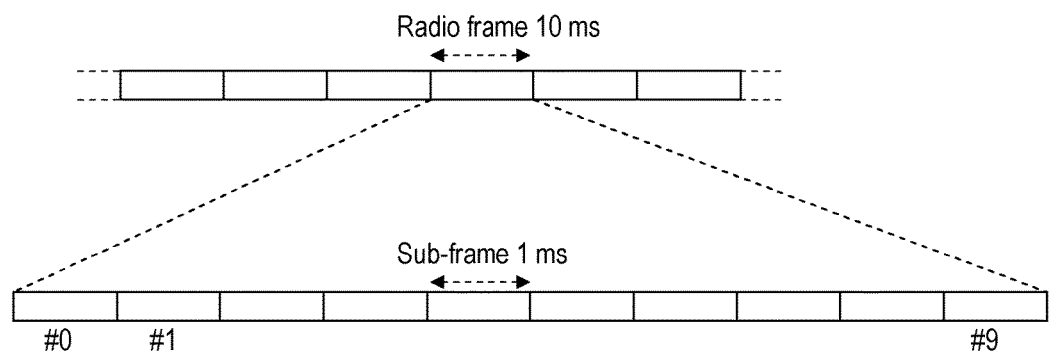
FIG. 1a is an illustration of a time domain for an LTE-based communication system.
Figure 1B:
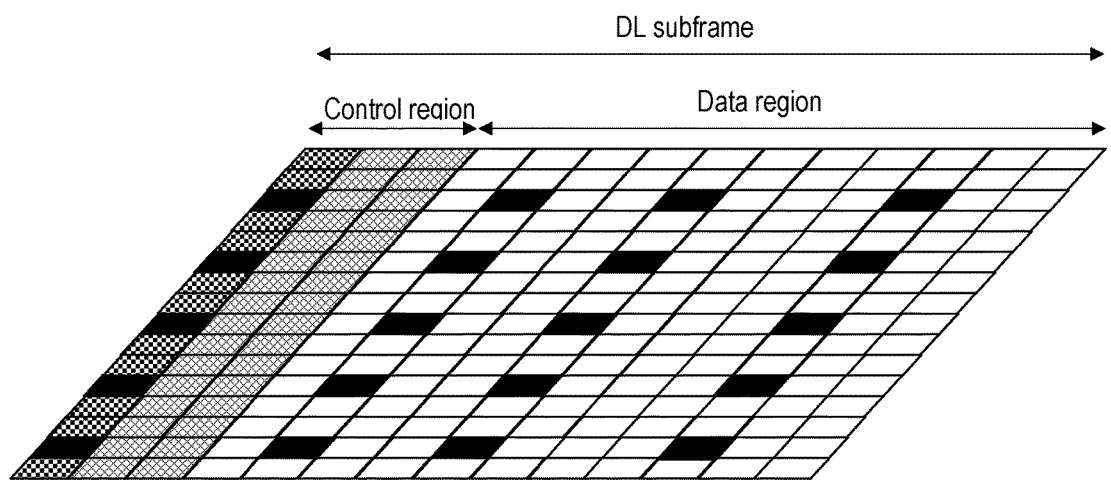
FIG. 1b is an exemplifying illustration of an LTE subframe.

Briefly described, exemplifying embodiments of a network node and method therein are provided for protecting control channels of a neighbouring RBS. The protection of the control channels in the neighbouring RBS is done by transmitting the control channels in at least one subframe out of a predetermined number of subframes with reduced transmission power in relation to a nominal transmission power. Exemplifying embodiments of an RBS and a method therein are also provided for transmitting control channels to UEs, wherein control channels are scheduled, for at least one UE, in subframes in which control channels are to be transmitted with reduced transmission power from the network node.

An exemplifying solution to protect control channels of neighbouring RBSs comprises expanding the ICIC. For example, exchange of interference indication for control channels over X2 by (a) exchanging of information about primary cell, PCell, versus Secondary Cell, SCell, carrier loading over the X2 interface, (b) exchanging of interference indication for data channels over the X2 interface, and (c) exchanging of interference indication for control channels over the X2 interface.

Thereafter, pre-configuration of protected PDCCH carrier components to involved RBSs by e.g. Operation, Administration and Maintenance, OAM, control is performed.

Then the exemplifying solution exchanges information about the configuration of protected PDCCH carrier component(s) over the X2 interface.

For the data part, no enhancements are to be made to current mechanisms. The current RNTP reporting mechanisms may be extended by enabling an RBS to indicate to another RBS the RNTP threshold it likes to receive a report about. The exemplifying solution enables an RBS to send the recommended transmit power and/or expected power reduction to another RBS to achieve protected resources. Current RNTP reporting mechanisms is extended by enabling an RBS to indicate to another RBS to increase or decrease the used RNTP threshold.

For the control part, protected PDCCH carrier component(s) are chosen by RBS(s) and information is exchanged via X2 whenever the cross-carrier scheduling is enabled. OAM provides protected PDCCH carrier component(s) preference list to each RBS, the RBS chooses PDCCH CC(s) in the provided list and exchanges the information with its cross-carrier scheduling partner through X2 whenever the cross-carrier scheduling is enabled. The set for protected carrier component(s) is configured in the aggressor RBS and signalled via the X2 interface to the victim RBS. Whenever cross scheduling is used to convey scheduling information to a user strongly interfered with by the macro cell, the pico cell configures the UE PCell from this protected set.

From a physical control channels interference protection point of view, the exemplifying solution is based on the idea of signalling frequency resources that are more or less protected from control plane interference. This approach is feasible for rather static configurations, where the frequency resource utilization does not change very dynamically. Control channels refer, in this disclosure, to the physical layer.

However, in scenarios where radio resource utilization needs to change dynamically and where frequency resources cannot be partitioned in a semi-static way between neighbour RBSs, it would be beneficial that time domain based mechanisms for partitioning control plane protected resources are adopted. This would enable co-channel deployments and dynamic rearrangement of protected resources according to the radio conditions and traffic needs.

Figure 2A:
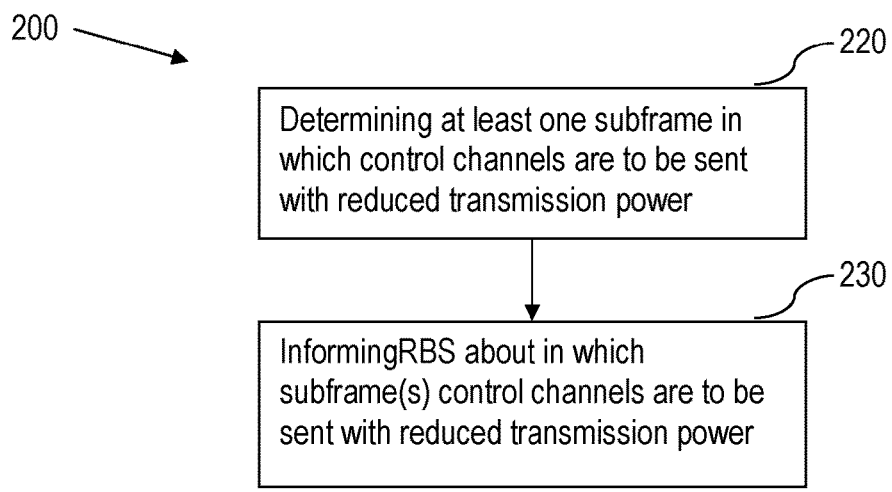
FIG. 2a is a flowchart of a method in a network node for protecting control channels of a neighbouring Radio Base Station, RBS, according to an exemplifying embodiment.

An exemplifying embodiment of a method performed by a Network Node for protecting control channels of a neighbouring RBS will now be described with reference to FIG. 2a. FIG. 2a is a flowchart of a method in a network node for protecting control channels of a neighbouring RBS according to an exemplifying embodiment. The network node and the RBS are adapted to be operable in an Orthogonal Frequency Division Multiplexing, OFDM, based radio communication network.

FIG. 2a illustrates the method as comprising determining 220 at least one subframe out of a predetermined number of subframes in which control channels are to be transmitted with reduced transmission power in relation to a nominal transmission power, and informing 230 the RBS which subframe(s) out of the predetermined number of subframes in which control channels are to be transmitted with reduced transmission power.

The network node and the RBS are synchronised with each other such that the RBS knows the point in time when the network node transmits each respective subframe. In other words, at the point in time when the network node transmits its subframe number 1, the RBS may transmit its subframe number X (which may be number 1 for the RBS as well). In this manner the number 1 subframe of the network node overlaps, in time, subframe number X of the RBS. The network node may be a first RBS and the RBS discussed above is a neighbouring RBS to the first RBS. In other words, the network node may correspond to an RBS A, and the RBS may correspond to an RBS B. Hereinafter, the network node may also be referred to as the first RBS, RBS A or the first RBS A. The RBS discussed above, being a neighbouring RBS to the first RBS may hereinafter also be referred to as the second RBS, RBS B or the second RBS B.

At a point in time, the network node decides that control channels are to be transmitted from the network node at reduced transmission power in relation to a nominal transmission power in at least one subframe. The network node then determines which subframe(s) out of the predetermined number of subframes in which control channels are to be transmitted with reduced transmission power in relation to a nominal transmission power. The network node may determine that control channels are to be transmitted from the network node at reduced transmission power in one, two, three or up to all of the predetermined number of subframes. In action 220, the network node determines at least one subframe in which control channels are to be transmitted with reduced transmission power. By this is meant that the network nodes decide which subframe, or which subframes, out of the predetermined number of subframes in which control channels are to be transmitted with reduced transmission power. Hereinafter, reduced transmission power is always in relation to a nominal transmission power.

The network node then informs the RBS which subframe(s) out of the predetermined number of subframes in which control channels are to be transmitted with reduced transmission power.

This enables the RBS to know, or deduce, which subframes the RBS may use to transmit its control channels to at least one UE currently being associated with the RBS, which UE is experiencing interference from the network node. Since the network node will transmit control channels with reduced transmission power in at least one subframe, the RBS may transmit, in its corresponding subframe, its control channels intended for the UE. Since the network node is transmitting the control channels with reduced transmission power in the subframe(s), the network node will cause less interference towards the UE receiving the control channels transmitted from the RBS.

The exemplifying embodiment of the method described above has several advantages. For example, mechanisms are provided for control region interference mitigation. Further, the method and/or the network node may be used in conjunction with the currently standardised data region interference. Another advantage may be that the peer-to-peer signalling may be used which enables full autonomy for the RBS to perform an internal evaluation of the best scheduling strategy for the UE(s). Still a possible advantage is that the solution is flexible enough to adapt to the variability of the control region duration in each subframe. The solution has no impact on the UEs hence the solution may be employed for all existing UEs.

According to an embodiment, the control channels to be transmitted with reduced transmission power are Physical Layer Downlink Control Channels, PDCCH, related to scheduling of UE specific data, wherein control channels relating to system information are transmitted with nominal transmission power.

There are different control channels in an OFDM-based radio communication network. One type of control channel is the PDCCH and another type comprises system information, e.g. the Physical Control Format Indicator Channel, PCFICH. The PCFICH carries a Control Frame Indicator, CFI, which includes the number of OFDM symbols used for control channel transmission in each subframe, typically 1, 2, or 3. The 32-bit long CFI is mapped to 16 Resource Elements in the first OFDM symbol of each downlink frame using QPSK modulation. Another type of control channels is the Physical Hybrid ARQ Indicator Channel, PHICH. The PHICH carries the HARQ ACK/NAK which indicates to the UE whether the network node correctly received uplink user data carried on a Physical Uplink Shared Channel, PUSCH. In this example, only the PDCCH may be sent with reduced transmission power and the other control channels, such as e.g. the PCFICH and the PHICH are transmitted with nominal transmission power.

According to still another embodiment, determining 220 which subframe(s) in which control channels are to be transmitted with reduced transmission power in relation to a nominal transmission power comprises selecting subframe(s) in which data channels are to be transmitted with reduced transmission power.

In the OFDM based radio communication system, a subframe carries both data and control signalling in different OFDM symbols. Typically, a resource block in a subframe comprises a control region and a data region. In this embodiment, the network node determines if data is to be transmitted with reduced power in any of the predetermined subframes. If so, the network node determines to "overlap" the subframes in which control channels are to be sent with reduced power with the subframes in which data is to be sent with reduced power. In other words, the network node selects those subframes in which data is to be sent with reduced power and also transmits the control channels with reduces power. It shall be pointed out that the number of subframes in which data is to be sent with reduced power need not be the same number of subframes in which control channels are to be sent with reduced power.

Consequently, if there are more subframes in which data is to be sent with reduced power than there are subframes in which control channels are to be sent with reduced power, then some of the subframes in which data is to be sent with reduced power will also comprise control channels to be sent with reduced power.

On the other hand, if there are fewer subframes in which data is to be sent with reduced power than there are subframes in which control channels are to be sent with reduced power, then all of the subframes in which data is to be sent with reduced power will also comprise control channels to be sent with reduced power, and some subframes in which data is to be sent with nominal power, the control channels will be sent with reduced transmission power.

According to still another embodiment, determining 220 which subframe(s) in which control channels are to be transmitted with reduced transmission power in relation to a nominal transmission power is perform independently of in which subframe(s) data channels are to be transmitted with reduced transmission power.

In this embodiment, the network node does not take any notice of whether any subframe may comprise data to be sent with reduced transmission power. The network node determines which subframe(s) in which control channels are to be transmitted with reduced transmission power. There may be subframes in which data is to be sent with reduced transmission power, but there may not be. Irrespective of whether there are subframes in which data is to be sent with reduced transmission power or not, the network nodes determine which subframe(s) in which control channels are to be transmitted with reduced transmission power.

According to yet another embodiment, informing 230 the RBS which subframe(s) in which control channels are to be transmitted with reduced transmission power comprises indicating the amount of power reduction with which the control channels are to be transmitted.

There may be several levels of power reduction with which the control channels are to be transmitted. In an example, the amount or level of reduction can be expressed as a percentage of the nominal transmission level, e.g. 40%, 50%, 60%, 70%, 80% or 90%. The amount or level of reduction may depend on the distribution of UEs within a coverage area or cell of the network node. For a UE being located relatively close to the network node, the amount or level of reduction of transmission power may be larger than for a UE being located relatively far away from the network node. Further, the power reduction is in one example dependent on link adaptation of PDCCH.

According to an embodiment, the network node (RBS A) informs the RBS (RBS B) which subframe(s) out of the predetermined number of subframes in which control channels are to be transmitted with reduced transmission power is done by means of an X2 interface.

In wireless communication networks employing e.g. Long Term Evolution, LTE, the RBSs may communicate peer-to-peer by means of the X2 interface. In this manner, two RBSs may exchange information between each other. In this example, the network node (being an RBS) informs the RBS which subframe(s) out of the predetermined number of subframes in which control channels are to be transmitted with reduced transmission power.

Alternatively, the network node (RBS A) informs the RBS (RBS B) which subframe(s) out of the predetermined number of subframes in which control channels are to be transmitted with reduced transmission power by means of an S1 interface. In such a case, the network node and the RBS do not communicate peer-to-peer.

In an embodiment, determining 220 the at least one subframe to be transmitted with reduced transmission power is performed as a response to receiving, from the RBS, a message indicating that the network node is causing interference to at least one UE currently being associated with the RBS.

As described above, the RBSs in the communication network send out reference signals which are measured by the different UEs in the communication network. The RBS, i.e. the neighbouring second RBS B to the network node (RBS A), also sends out reference signals and receives measurement reports from the UEs currently being served by, or connected to, the RBS B. As described above, the network node may cause interference to the control channels for UEs of the RBS B, especially for those UEs which are located far from RBS B and close to a cell border of RBS B, i.e. they are relatively close to the network node compared to the UEs being located close to the RBS B. Such knowledge will be obtained by the RBS B from the received measurement reports. The RBS B may then transmit an indication to the network node (RBS A) that the network node is causing interference to at least one UE currently being associated with the RBS B. In this manner, the network node receives a trigger to determine at least one subframe to be transmitted with reduced transmission power. The network node then determines which subframes to be transmitted with reduced transmission power out of the predetermined number of subframes and informs the RBS B which subframes will be transmitted with reduced transmission power. Hence, the RBS B is enabled to schedule control channels in subframes for the UE(s) experience interference from the network node, in corresponding subframes in time when the network node transmits control channels with reduced transmission power. Those subframes when the network node transmits control channels with reduced transmission power will protect the control channels of the RBS B from interference due to transmissions of control channels from the network node with reduced transmission power.

According to yet another embodiment, the received message is an X2 LOAD INFORMATION message comprising an Information Element indicating a request for reduced control channel power transmission.

The RBSs are enabled to communicate directly via the X2 interface. There is a plurality of messages already defined and in this embodiment, the X2 LOAD INFORMATION message is used. The X2 LOAD INFORMATION message comprises in turn a plurality of Information Elements. One of the Information Elements is used to convey to the network node, RBS A, that UEs connected to the network node are causing interference to UEs connected to the RBS B. Hence the RBS B requests the network node to transmit control channels in at least one subframe with reduced transmission power.

According to still another embodiment, determining 220 the at least one subframe to be transmitted with reduced transmission power is performed as a response to receiving indications from User Equipments, UEs, currently being associated with the network node indicating at least one UE requiring the control channels to be sent with nominal transmission power and indicating at least one UE not requiring the control channels to be sent with nominal transmission power.

The network node being an RBS, as described above, transmits reference signals across its coverage area, or cell. The UEs which can "hear" the reference signals, i.e. receive the reference signals, performs different measurements on the reference signals. The measurements pertain to different aspects of a channel quality. One example of a measurement that is performed on the reference signals is the Channel Quality Information, CQI. Once the UEs have performed the different measurements of the reference signals, the UEs transmit measurement reports to the network node.

An example of how to use these measurements is link adaptation. Downlink control channel power is decided by the network node by means of link adaptation. Link adaptation is the ability to adapt the modulation scheme and the coding rate of the error correction according to the quality of the radio link. The LTE link adaptation is based on measured instantaneous Signal to Interference and Noise Ratio, SINR, which is used for selecting Modulation and Coding Scheme, MCS for transmissions. The link adaptation is performed on the PDSCH and not on the PDCCH. The link adaptation related to Mobile Service Centres, MCSs, is based on reported CQI which in turn depends on by UE estimated SINR.

In this manner, the network node may determine a current situation its cell, or coverage area, and the network node will know if some UE(s) experience good radio conditions, i.e. signal quality. The network node will also know if some UE(s) experience poor radio conditions. A UE experiencing good radio conditions may not need to have the control channels intended for the UE transmitted at nominal transmission power, whereas a UE experiencing poor radio conditions, i.e. UEs experiencing limited coverage, may require the control channels intended for the UE to be transmitted at nominal transmission power in order for the UE to be able to receive them correctly.

As a result, the network node may dynamically differentiate the transmission power used to transmit control channels to different UEs served by the network node according to current radio conditions in the cell of the network node.

In general, assuming that the UEs in the cell of the network node are distributed somewhat homogenously and there not being too many UEs in the cell, a UE being far from the network node typically requires the control channels to be sent with nominal transmission power, whereas a UE being close to the network node may receive the control channels adequately even if the control channels are transmitted with reduced transmission power. Also, a UE being located far from the network node, requiring the control channels to be sent with nominal transmission power may more likely cause interference to a neighbouring cell, and the control channels being sent at nominal transmission power may cause interference to the neighbouring cell. Especially if there are one or more UEs located close to a cell border of the neighbouring RBS, these UEs may experience interference on their control channels due to the network node transmitting control channels at nominal transmission power.

In order to determine a suitable ratio of subframes in which control channels are transmitted with reduced power, the network node may e.g. base this ratio upon a link adaptation mechanism related to control channel transmissions. Here the link adaptation refers to selecting number of control channel elements, CCEs, for controlling the encoding ratio of the control channel transmissions. UEs with poor radio conditions need more CCEs in order to reliably detect the control channel. The network node may then base the ratio of subframes in which control channels are transmitted with reduced power on the need for network node to serve UEs requiring maximum number of CCEs for reliably detecting the physical downlink control channels when transmitting with nominal power. Such UEs are typically operating from, or being located at, the cell edge. Thus, reducing the downlink control channel transmit power targeting such UEs could lead to outage. Furthermore, the ratio of subframes in which control channels are transmitted with reduced power depends not only on the number of UEs requiring maximum, or many, CCEs but also on their traffic loads/activities. A low traffic load among serving cell edge UEs could imply that a larger ratio of subframes with reduced power on control channel can be allocated.

The number of subframes or Physical Resource Blocks, PRBs, in which data channels are transmitted with reduced power in subframes with reduced transmit power on control channels can e.g. be based on comparing the need of serving centre UEs, i.e. UEs that need less CCEs to reliably detect the control channels, with the traffic load of cell edge UEs in the neighbouring RBS(s), indicated via load information messages over X2

In an example, the method further comprises grouping the UEs into at least two groups based on the received measurement reports such that UEs requiring the control channels to be sent with nominal transmission power are grouped together and the UEs not requiring the control channels to be sent with nominal transmission power are grouped together.

Based on for example the received measurement reports, the network node, or RBS A, may group the UEs currently being served by, or connected to, the network node into at least two groups. One group may comprise of UEs needing the control channels to be sent with nominal transmission power. A second group may comprise of UEs for which control channels may be transmitted with slightly reduced transmission power. A third group may comprise of UEs for which control channels may be transmitted with substantially reduced transmission power.

According to still another embodiment, the method further comprising scheduling 240 control channels in the subframes in which the control channels are transmitted with nominal power for UEs requiring the control channels to be sent with nominal transmission power and scheduling control channels in the subframes in which control channels are transmitted with reduced power for UEs not requiring the control channels to be sent with nominal transmission power.

Once the network node has determined which UE(s) require the control channels to be sent with nominal transmission power and which UE(s) does not require the control channels to be sent with nominal transmission power, then the network node may start scheduling the control channels to the different UEs currently being served by, or connected to, the network node. The network node may then schedule control channels in the subframes in which the control channels are transmitted with nominal power for UEs requiring the control channels to be sent with nominal transmission power and scheduling control channels in the subframes in which control channels are transmitted with reduced power for UEs not requiring the control channels to be sent with nominal transmission power. Of course also here there may be different levels of reduced transmission power, wherein the network node will schedule the control channels accordingly.

Figure 2B:
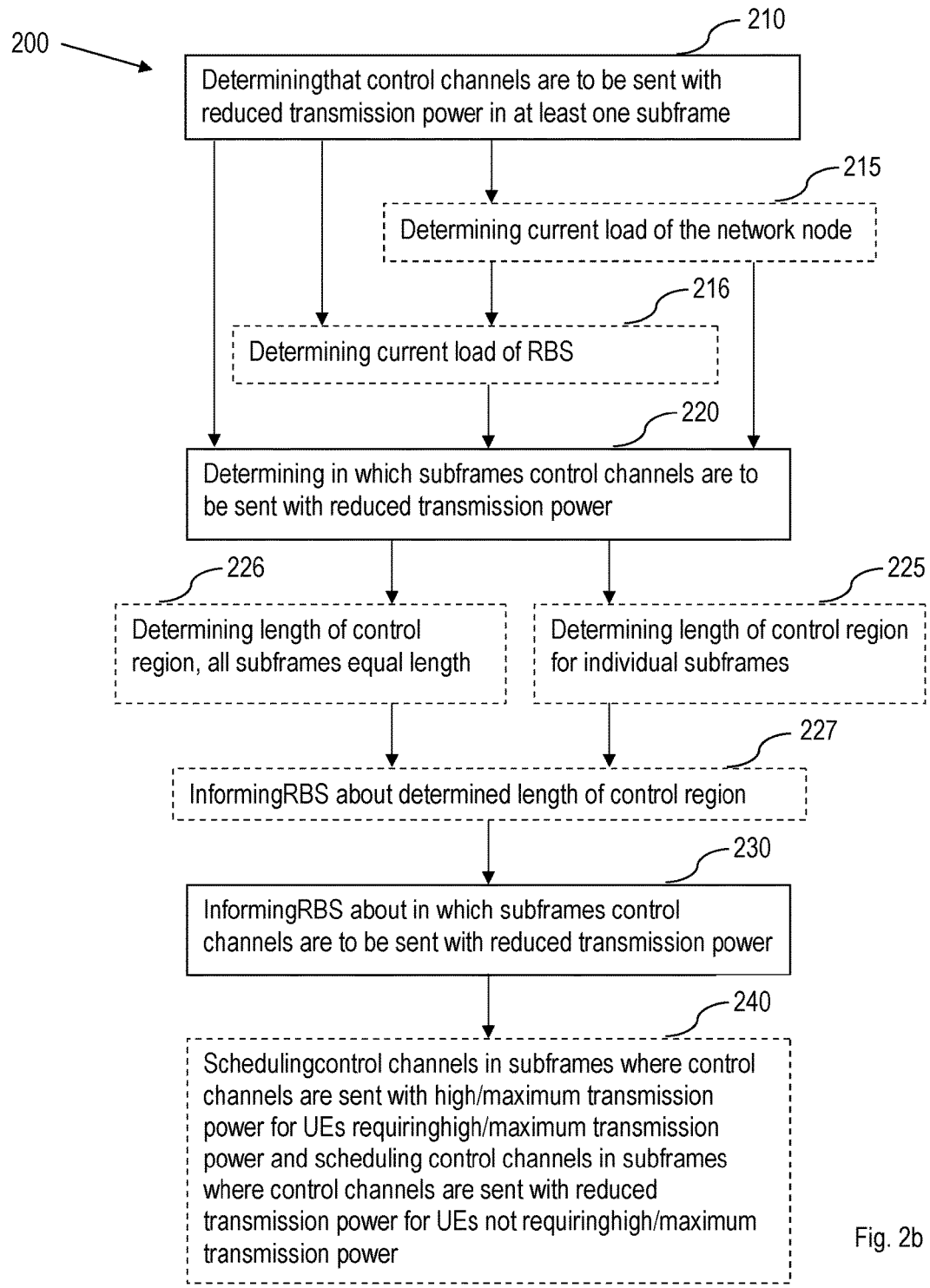
FIG. 2b is a flowchart of a method in a network node for protecting control channels of a neighbouring RBS according to another exemplifying embodiment.

According to still another embodiment, illustrated in FIG. 2b, the method 200 further comprises determining 215 at least a current load for the network node, wherein the determining 220 which subframes out of a predetermined number of subframes in which control channels are to be transmitted with reduced power is at least partly based on the current load for the network node.

There may be different factors affecting any interference situation within cells or between cells, a cell being a coverage area of an RBS. One example of a factor affecting interference in the coverage area of the network node is the current load for the network node. A relatively large amount of UEs engaging in different services requiring data and signalling being transmitted over the air may result in more interference than a relatively small amount of UEs engaging in different services requiring data and signalling being transmitted over the air.

In this embodiment, the network node determines the current load of the network node. This is illustrated in FIG. 2b by dashed box 215. By the box being dashed is indicated that this is an optional embodiment, as are all the other dashed boxes in the figure which will be explained below. Once the network node has determined the current load, the network node determines 220 which subframes out of a predetermined number of subframes in which control channels are to be transmitted with reduced power at least partly based on the current load of the network node. A relatively high load of the network node may result in the network node determining relatively small number of subframes in which control channels are sent with reduced transmission power. A relatively low load of the network node may result in the network node determining relatively large number of subframes in which control channels are sent with reduced transmission power.

FIG. 2b further illustrates an action 210, wherein the network node determines that control channels are to be sent with reduced transmission power in at least one subframe. This action may be taken by the network node at the discretion of the network node. This action may alternatively be taken in response to receiving measurement reports from the UE(s) indicating at least one UE requiring the control channels to be sent with nominal transmission power and indicating at least one UE not requiring the control channels to be sent with nominal transmission power. In yet another example, this action may be taken in response to receiving from the RBS, a message indicating that the network node is causing interference to at least one UE currently being associated with the RBS.

According to yet another embodiment, the method further comprises determining 216 at least a current load for the RBS, wherein the determining 220 which subframes out of a predetermined number of subframes in which control channels are to be transmitted with reduced power is at least partly based on the current load for the RBS.

In this is an example, the RBS, i.e. the neighbouring RBS B, may have a load situation which affects the interference situation for RBS B. For example, the RBS B may have a relatively high load resulting in a relatively high interference within the cell or coverage area of RBS B. Further, there may be relatively many UEs located at the cell border of RBS B adjacent to the network node which are subjected to interference by the network node. The RBS B informs, e.g. by means of X2 signalling, the network node of the current load situation and the network node determines 220 which subframes out of a predetermined number of subframes in which control channels are to be transmitted with reduced power at least partly based on the current load of the RBS B. This is illustrated in FIG. 2b by the dashed box 216. A relatively high load of the RBS B may cause the network node to determine more subframes in which control channels are sent with reduced transmission power. A relatively low load of the RBS B may cause the network node to assign fewer subframes in which control channels are sent with reduced transmission power.

As can be seen in FIG. 2b, the network node may determine which subframes out of a predetermined number of subframes in which control channels are to be transmitted with reduced transmission power at least partly based on both the current load of the network node and on the current load of the RBS B.

According to an embodiment, the reduced power is differentiated into a plurality of individual levels, wherein the determining 220 which subframes out of a predetermined number of subframes in which control channels are to be transmitted with reduced transmission power further comprises determining an individual transmission power level for each of the subframes in which control channels are to be transmitted with reduced transmission power.

As described above, there may be a plurality of individual levels of reduced transmission power. Then control information may be sent in different subframes with individual transmission power level for each of the subframes. Merely as an example, the received measurement reports may be employed by the network node to determine individual levels, e.g. four different transmission power levels, with regard to the current interference situation for the UEs currently being served by, or connected to, the network node. The network node may then also group the UEs into four different groups with regard to both the interference and the required transmission level of the control channels. The network node may then assign a specific transmission power level for each of the groups. Then the network node may schedule the control channels to the different UEs currently being served by, or connected to, the network node in accordance with the groups and corresponding transmission levels.

In an embodiment, the method further comprises determining 225 a length of a control region of individual subframes of the predetermined number of subframes, wherein the length of the control region is one of 1, 2 or 3 OFDM symbols. The method further comprises informing 226 the RBS of the determined length of the control region of the individual subframes of the predetermined number of subframes by means of an X2 interface.

The control region comprises 1, 2 or 3 OFDM symbols, i.e. the first 1, 2 or 3 OFDM symbols of the subframe. The remaining 11, 12 or 13 OFDM symbols constitute the data region. However, a subframe may comprise more or fewer OFDM symbols than 14. This means that the length of the control region, in which control channels are transmitted may vary from subframe to subframe. The network node may in this manner determine, for each individual subframe out of the predetermined subframes, the individual length of the control region. Once the network node has performed this determination, the network node informs the RBS of the determined length of the control region of the individual subframes of the predetermined number of subframes. As described before, the network node being an RBS (RBS A), two RBSs may communicate by means of X2 signalling or interface.

When the RBS is notified about the length of the control region of individual subframes, the RBS is enabled to make use of this information and schedule control signalling to UE currently being served by, or connected to the RBS taking the length of the control region into account. Merely as an example, if the RBS is serving a UE being relatively far from the RBS and relatively close to the cell border of the RBS adjacent to the network node, the RBS may schedule control channels to that UE depending on in which subframes control channels are transmitted with reduced transmission power from the network node. Further, the RBS may adjust the control region of its subframes corresponding in time with the subframes transmitted from the network node so that the control region of two subframes overlapping in time, one being sent from the RBS and one being sent from the network node, have the same length.

It shall be pointed out that the X2 signalling may take place per subframe basis, so that the network node signals for each subframe, the length of the control region. Alternatively, the X2 signalling may have a lower granularity so that the network node may signal to the RBS at fewer instances and then signal more information. Merely as an example, the network node may signal to the RBS, when transmitting the first subframe out of the predetermined subframes, the length of the control region for all individual subframes. In another example, the network node may signal to the RBS, when transmitting the first subframe out of the predetermined subframes, the length of the control region of individual subframes for the first half of the subframes of the predetermined subframes. Then, once half the subframes are transmitted, signal to the RBS the length of the control region of individual subframes for the second half of the subframes of the predetermined subframes.

In another embodiment, the method further comprises determining 225 a length of a control region of the predetermined number of subframes, wherein the length of the control region is one of 1, 2 or 3 OFDM symbols, all the subframes having the same control region length, the method further comprising informing 226 the RBS of the determined length of the control region of the predetermined number of subframes.

In this embodiment, the network node determines 225 the length of the control region to be the same for each individual subframe of the predetermined number of subframes. As an example, assume that the predetermined number of subframes and 20. Then the network node determines that all 20 subframes have the same control region length, the length being 1, 2 or 3 OFDM symbols. Once the network node has determined the length of the control region, the network node informs 226 the RBS of the determined length of the control region of the predetermined number of subframes. Since all subframes have the same control region length, the network node needs to signal the length to the RBS only once. However, it may still be done on a per subframe basis.

Figure 2C:
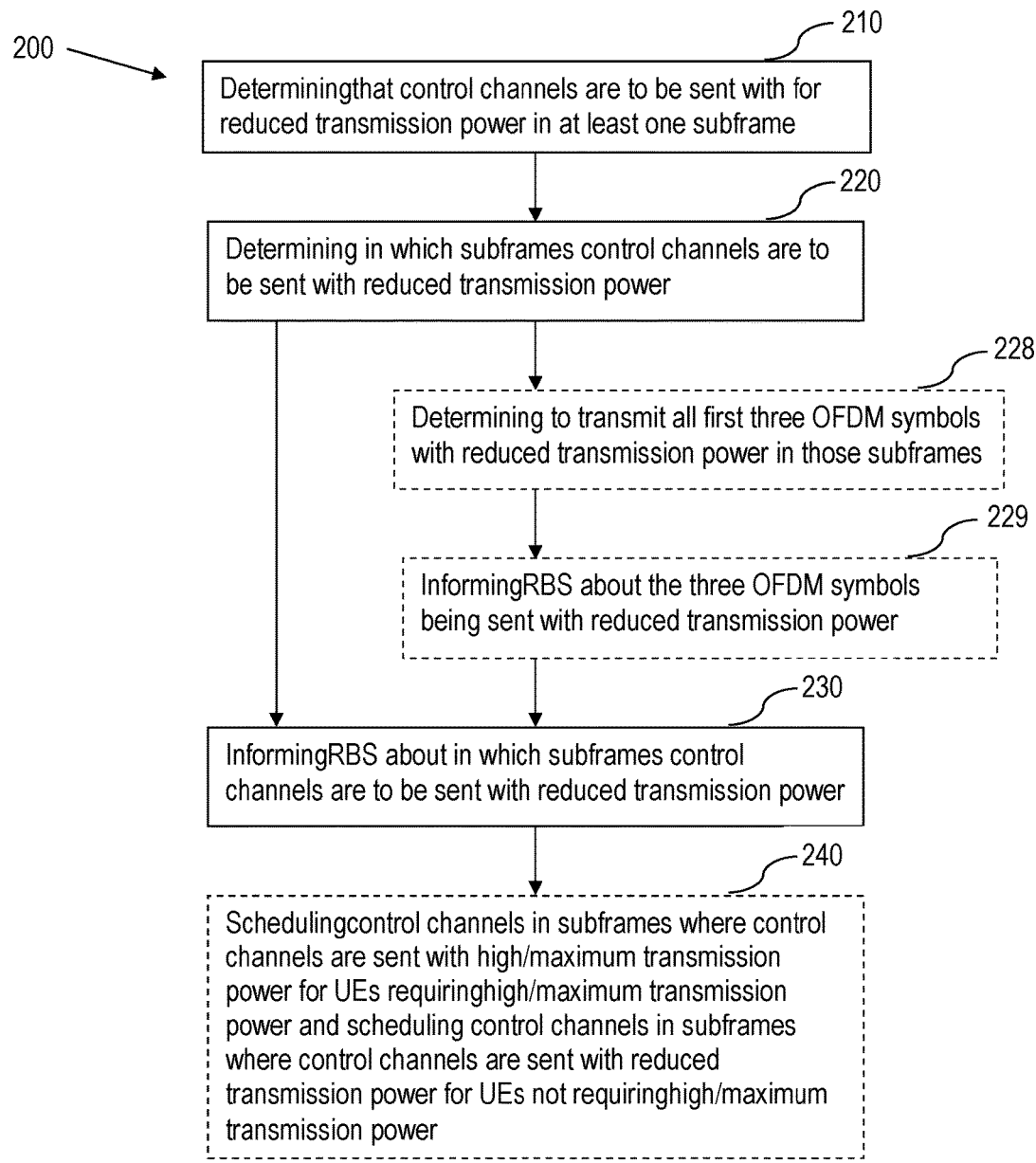
FIG. 2c is a flowchart of a method in a network node for protecting control channels of a neighbouring RBS according to another exemplifying embodiment.

In still another embodiment, illustrated in FIG. 2c, the method further comprises determining 228 to transmit the first three OFDM symbols with reduced transmission power in subframes in which control channels are to be transmitted with reduced transmission power of the predetermined and informing 229 the RBS about the decision.

When the network node has determined which subframe(s) out of the predetermined number of subframes in which control channels are to be transmitted with reduced transmission power, see action 220 in FIG. 2c, the network nodes then determines 228 that in these subframes, the first three OFDM symbols shall be transmitted with reduced transmission power. In order for the RBS to make use of the transmission pattern of the predetermined subframes, the network node informs 229 the RBS about in which subframes the first three OFDM symbols shall be transmitted with reduced transmission power. By pattern here is meant that some subframes out of the predetermined subframes will comprise control information transmitted with nominal transmission power and some subframes out of the predetermined subframes will comprise control information transmitted with reduced transmission power. The different subframes and their individual transmission power with regard to control channels form a pattern of subframes. It shall be pointed out that there may be different levels of reduced transmission power. Merely as an example, say that the number of predetermined subframes is 10; and that subframes number 0, 1, 3, 5, 6 and 8 will comprise control information transmitted with nominal transmission power; and that subframes number 2 and 7 will comprise control information transmitted with a first level of reduced transmission power; and that subframes number 4 and 9 will comprise control information transmitted with a second level of reduced transmission power; then the pattern may be illustrated by the size of the letters as 0, 1, 2, 3, 4, 5, 6, 7, 8, 9.

The network node may inform the RBS by means of X2 signalling as described above. FIG. 2c illustrates the method comprising the same action 230 as in FIGS. 2a and 2b, informing the RBS in which subframes are to be sent with reduced transmission power. However, actions 229 and 230 may be merged into one action. When the network node informs the RBS about in which subframes the first three OFDM symbols shall be transmitted with reduced transmission power, the RBS automatically knows that in these subframes control channels will be sent with reduced transmission power.

In yet another embodiment, the predetermined number of subframes are 40, wherein each subframe is 1 ms long.

The number of subframes may be thought of as a bit string of size 40, the bit string indicating a control channel protected pattern, see FIG. 3a. Each position in the bit string represents a downlink subframe for which a value, e.g. "1", indicates that the subframe is a 'control channel protected subframe', meaning that control channels for that subframe will be transmitted from the network node with reduced transmission power. A value, e.g. "0", indicates that the subframe is a 'non control channel protected subframe', meaning that control channels for that subframe will be transmitted from the network node with nominal transmission power. The first position of the bit string, or the control channel protected pattern, corresponds to subframe 0 in a radio frame where the System Frame Number, SFN, equals 0, i.e. SFN=0. The control channel protected pattern may be continuously repeated in all radio frames.

In Frequency Division Duplex, FDD, the pattern of the length of 40 subframes (i.e. 4 radio frames) assures that a victim RBS can transmit a grant in a protected subframe and then also transmit corresponding ACK/NACK of an uplink data transmission in a protected subframe (8 ms uplink HARQ timing: grant in subframe "n" results in an ACK/NACK in subframe "n+8"). This means that if "n" is a protected subframe in radio frame "N", subframe "n" in radio frame "N+4" will also be a protected subframe.

When determining which subframe(s) out of the predetermined number of subframes in which control channels are to be transmitted with reduced transmission power in relation to a nominal transmission power, a threshold may be used. The network node may then determine, for each of the subframes of the predetermined subframes, if the control channels should be sent with a transmission power above or below the threshold. Consequently, if the control channels should be sent with a transmission power below the threshold, then the channels are to be transmitted with reduced transmission power in relation to the nominal transmission power. If the control channels should be sent with a transmission power above the threshold, then the channels are to be transmitted with nominal transmission power. Then the network node may form a pattern in the same manner as described above so that the network node transmits a bit string of "0" and "1", where "1" indicates that control channels for the subframe will be transmitted with nominal transmission power and a "0" indicates that control channels for the subframe will be transmitted with reduced transmission power in relation to the nominal transmission power.

FIG. 3b is an example of a tabular description of Control Channel Interference Overload Indication. The RBS B may notify the aggressor of interference experienced on the control region for each subframe. Upon reception of a Control Channel Interference Overload Indication information, which is a part of an X2 LOAD INFORMATION message, the network node (RBS A) may decide to take different actions such as modify the pattern of Control Channel Protected resources (for example due to lack of pattern coordination with other network nodes causing interference for the UEs of the RBS) or modify the transmission power of control channels on subframes indicated by the RBS as highly interfered.

Alternatively, the Control Channel Interference Overload Indication may be reported to the OAM system, which may assist in coordination of Control Channel Interference Protected resource allocation amongst different network nodes causing interference for the UEs of the RBS, in case the patterns of protected resources between those network nodes are not in line or are inefficiently allocated.

Embodiments herein also relate to a method performed by a Radio Base Station, RBS, for transmitting control channels to User Equipments, UEs, currently being associated with the RBS in an Orthogonal Frequency Division Multiplexing, OFDM, based radio communication network. Such a method will now be described with reference to FIG. 4a.

Figure 4A:
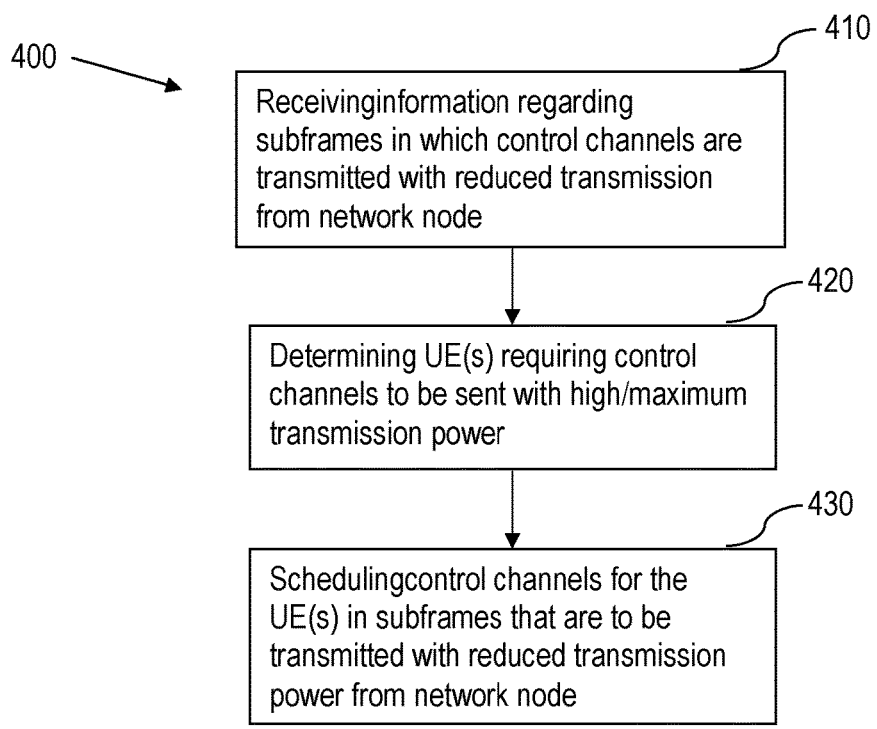
FIG. 4a is a flowchart of a method in a Radio Base Station, RBS, for transmitting control channels to User Equipments, UEs, according to an exemplifying embodiment.

FIG. 4a illustrates the method 400 comprising receiving 410 information from a network node regarding a number of, and which, subframes out of a predetermined number of subframes in which control channels are to be transmitted with reduced from the network node, and determining 420 at least one UE requiring the control channels to be sent with nominal transmission power. The method further comprises scheduling 430 control channels, for the at least one UE, in subframes in which control channels are to be transmitted with reduced power from the network node.

The RBS receives 410 information from the network node regarding a number of, and which, subframes out of a predetermined number of subframes in which control channels are to be transmitted with reduced from the network node. This means that the RBS receives advance information regarding a future transmission to be performed by the network node. The advance information tells the RBS that in certain specified subframe(s), the network node will send control channels to at least one UE it is serving with reduced transmission power. The result, for the RBS, is that in that or those subframes, the network node will cause less interference on the control channels for UEs being served by the RBS. The RBS then determines 420 at least one UE requiring the control channels to be sent with nominal transmission power. Such a UE may be located close to a cell border of the RBS. The UE might further be located relatively close to a cell border of the network node such that the UE is located close to an intersection of the cell borders of the RBS and the network node. Such a UE is likely to experience interference from the network node and also to require the RBS to transmit at nominal power. Hence, the RBS schedules 430 control channels, for that at least one UE, in subframes in which control channels are to be transmitted with reduced power from the network node. In this manner, control channels from the RBS are protected from interference from the network node.

The method performed by RBS has several advantages. For example, mechanisms are provided for control region interference mitigation. Further, the method and/or the RBS may be used in conjunction with currently standardised data region interference. Another advantage may be that peer-to-peer signalling may be used which enables full autonomy for the RBS to perform an internal evaluation of the best scheduling strategy for the UE(s). Still a possible advantage is that the solution is flexible enough to adapt to the variability of the control region duration in each subframe. The solution has no impact on the UEs hence the solution may be employed for all existing UEs.

According to an embodiment, the method further comprises 400 transmitting 405, to the network node, a message indicating that the network node is causing interference to the at least one UE currently being associated with the RBS.

The RBS transmits reference channels on which the UEs served by the RBS perform different measurements. The UEs and the RBS exchange information, e.g. by means of the UE sending measurement reports to the RBS as described above in conjunction with the network node, so that the RBS becomes aware of the current situation and/or conditions in its cell. The RBS obtains knowledge, or is informed, that at least one UE currently being served by the RBS is experience interference from the network node. As a result of obtaining this information, the RBS transmits 405 a message to the network node indicating that the network node is causing interference to the at least one UE currently being associated with the RBS. This enables, or triggers, the network node to start evaluating if it shall determine at least one subframe out of a predetermined number of subframes in which control channels are to be transmitted with reduced transmission power in relation to a nominal transmission power.

According to an embodiment, the at least one UE is identified based on received measurement reports from UEs currently being associated with the RBS.

Embodiments herein also relate to a network node adapted for protecting control channels of a neighbouring RBS in an OFDM based radio communication network. The network node has the same technical features, objects and advantages as the method performed by the network node. Hence, the network node will only be described in brief in order to avoid unnecessary repetition.

Figure 5:
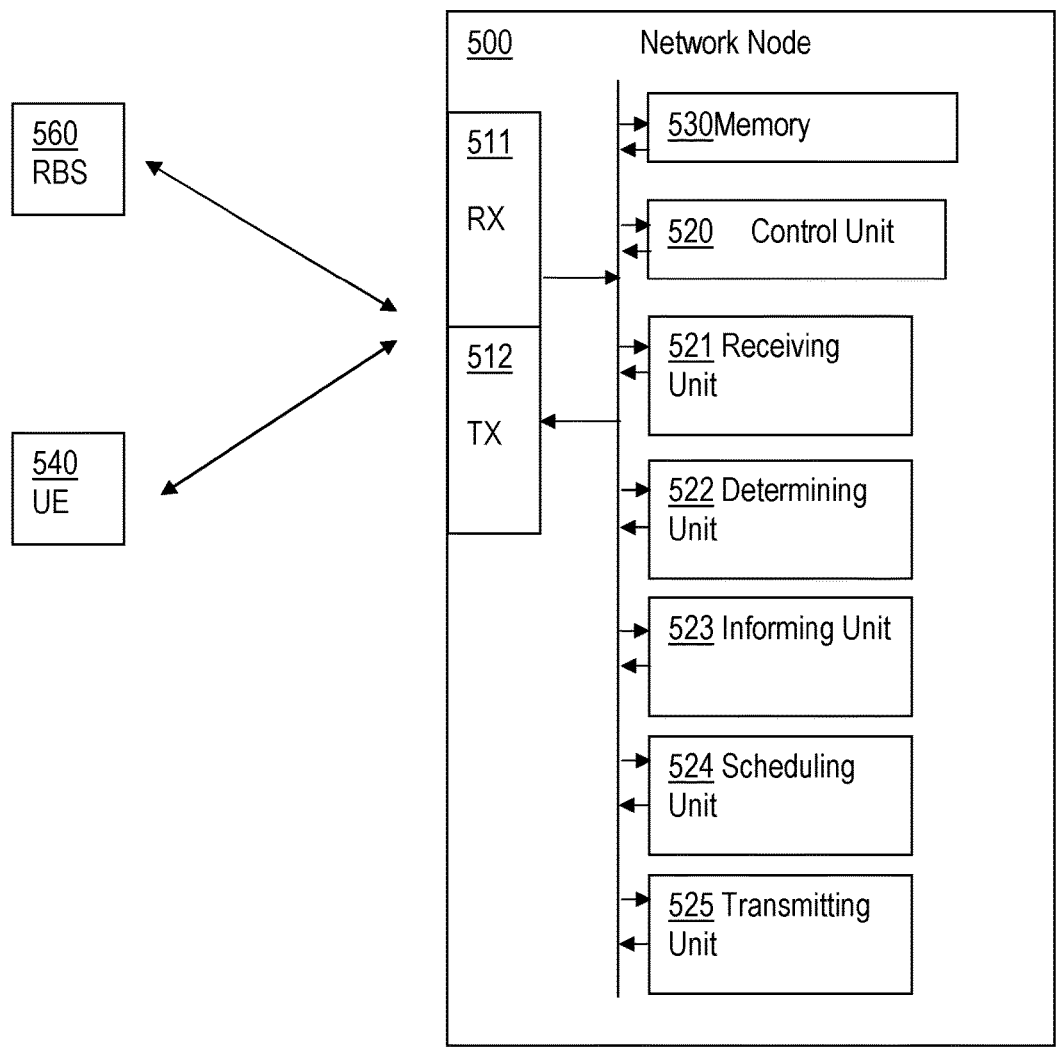
FIG. 5 is a block diagram of a network node adapted for protecting control channels of a neighbouring RBS according to an exemplifying embodiment.

FIG. 5 is a block diagram of a network node 500 adapted for protecting control channels of a neighbouring RBS 560 according to an exemplifying embodiment. The network node 500 and the RBS 560 are adapted to be operable in an OFDM based radio communication network. FIG. 5 illustrates the network node 500 comprising a determining unit 522 adapted to determine at least one subframe out of a predetermined number of subframes in which control channels are to be transmitted with reduced transmission power in relation to a nominal transmission power. The network node 500 further comprises an informing unit 523 adapted to inform the RBS 560 which subframe(s) out of the predetermined number of subframes in which control channels are to be transmitted with reduced transmission power.

The exemplifying embodiment of the network node described above has several advantages. For example, mechanisms are provided for control region interference mitigation. Further, the method and/or the network node may be used in conjunction with currently standardised data region interference. Another advantage may be that peer-to-peer signalling may be used which enables full autonomy for the RBS to perform an internal evaluation of the best scheduling strategy for the UE(s). Still a possible advantage is that the solution is flexible enough to adapt to the variability of the control region duration in each subframe. The solution has no impact on the UEs hence the solution may be employed for all existing UEs.

According to an embodiment, the control channels to be transmitted with reduced transmission power are Physical Layer Downlink Control Channels, related to scheduling of UE specific data, wherein control channels relating to system information are transmitted with nominal transmission power.

According to still another embodiment, the determining unit 522 is adapted to determine which subframe(s) in which control channels are to be transmitted with reduced transmission power in relation to a nominal transmission power comprises selecting subframe(s) in which data channels are to be transmitted with reduced transmission power.

According to yet another embodiment, the determining unit 522 is adapted to determine which subframe(s) in which control channels are to be transmitted with reduced transmission power in relation to a nominal transmission power is perform independently of in which subframe(s) data channels are to be transmitted with reduced transmission power.

According to an embodiment, the informing unit 523 is adapted to inform the RBS which subframe(s) in which control channels are to be transmitted with reduced transmission power and to indicating the amount of power reduction with which the control channels are to be transmitted.

According to still another embodiment, the informing unit 523 is adapted to informing the RBS which subframe(s) out of the predetermined number of subframes in which control channels are to be transmitted with reduced transmission power by means of an X2 interface.

According to yet another embodiment, the determining unit 522 is adapted to determine the at least one subframe to be transmitted with reduced transmission power is performed as a response to a receiving unit 521 of the network node receiving, from the RBS, a message indicating that the network node is causing interference to at least one UE currently being associated with the RBS.

According to yet another embodiment, the received message is an X2 LOAD INFORMATION message comprising an Information Element indicating a request for reduced control channel power transmission.

According to still another embodiment, the determining unit 522 is adapted to determine the at least one subframe to be transmitted with reduced transmission power as a response to the receiving unit 521 receiving indications from User Equipments, UEs, currently being associated with the network node indicating at least one UE requiring the control channels to be sent with nominal transmission power and indicating at least one UE not requiring the control channels to be sent with nominal transmission power.

According to an embodiment, the network node further comprises a scheduling unit 524 adapted to schedule control channels in the subframes in which the control channels are transmitted with nominal power for UEs requiring the control channels to be sent with nominal transmission power and to schedule control channels in the subframes in which control channels are transmitted with reduced power for UEs not requiring the control channels to be sent with nominal transmission power.

According to an embodiment, the determining unit 522 is further adapted to determine at least a current load for the network node, wherein the determining unit 522 is adapted to determine which subframes out of a predetermined number of subframes in which control channels are to be transmitted with reduced power at least partly based on the current load for the network node.

According to still another embodiment, the determining unit 522 is further adapted to determine at least a current load for the RBS, wherein the determining unit 522 is adapted to determine which subframes out of a predetermined number of subframes in which control channels are to be transmitted with reduced power at least partly based on the current load for the RBS.

According to yet another embodiment, the reduced power is differentiated into a plurality of individual levels, wherein the determining unit 522 is further adapted to determine which subframes out of a predetermined number of subframes in which control channels are to be transmitted with reduced transmission power by determining an individual transmission power level for each of the subframes in which control channels are to be transmitted with reduced transmission power.

In an example, the network node comprises a differentiating unit adapted to differentiate the reduced power into a plurality of individual levels. Alternatively, the differentiation of the reduced power into a plurality of individual levels is performed by a higher layer node, or a core network node, e.g. an operation, administration and maintenance node, OAM, wherein the different individual levels are signalled to the network node from the higher layer node or the core network node.

According to yet another embodiment, the determining unit 522 is further adapted to determine a length of a control region of individual subframes of the predetermined number of subframes, wherein the length of the control region is one of 1, 2 or 3 OFDM symbols, wherein the informing unit 523 is further adapted to inform the RBS of the determined length of the control region of the individual subframes of the predetermined number of subframes by means of an X2 interface.

According to still another embodiment, the determining unit 522 is further adapted to determine a length of a control region of the predetermined number of subframes, wherein the length of the control region is one of 1, 2 or 3 OFDM symbols, all the subframes having the same control region length, wherein the informing unit 523 is further adapted to inform the RBS of the determined length of the control region of the predetermined number of subframes.

According to an embodiment, the determining unit 522 is further adapted to determine to transmit the first three OFDM symbols with reduced transmission power in subframes in which control channels are to be transmitted with reduced transmission power of the predetermined wherein the informing unit 523 is further adapted to inform the RBS about the decision.

According to an embodiment, the predetermined number of subframes are 40, wherein each subframe is 1 ms long.

Embodiments herein also relate to an RBS adapted for transmitting control channels to UEs currently being associated with the RBS. The RBS is operable in an OFDM based radio communication network. The RBS has the same technical features, objects and advantages as the method performed by the RBS as described above. The RBS will be described in brief in order to avoid unnecessary repetition.

Figure 6:
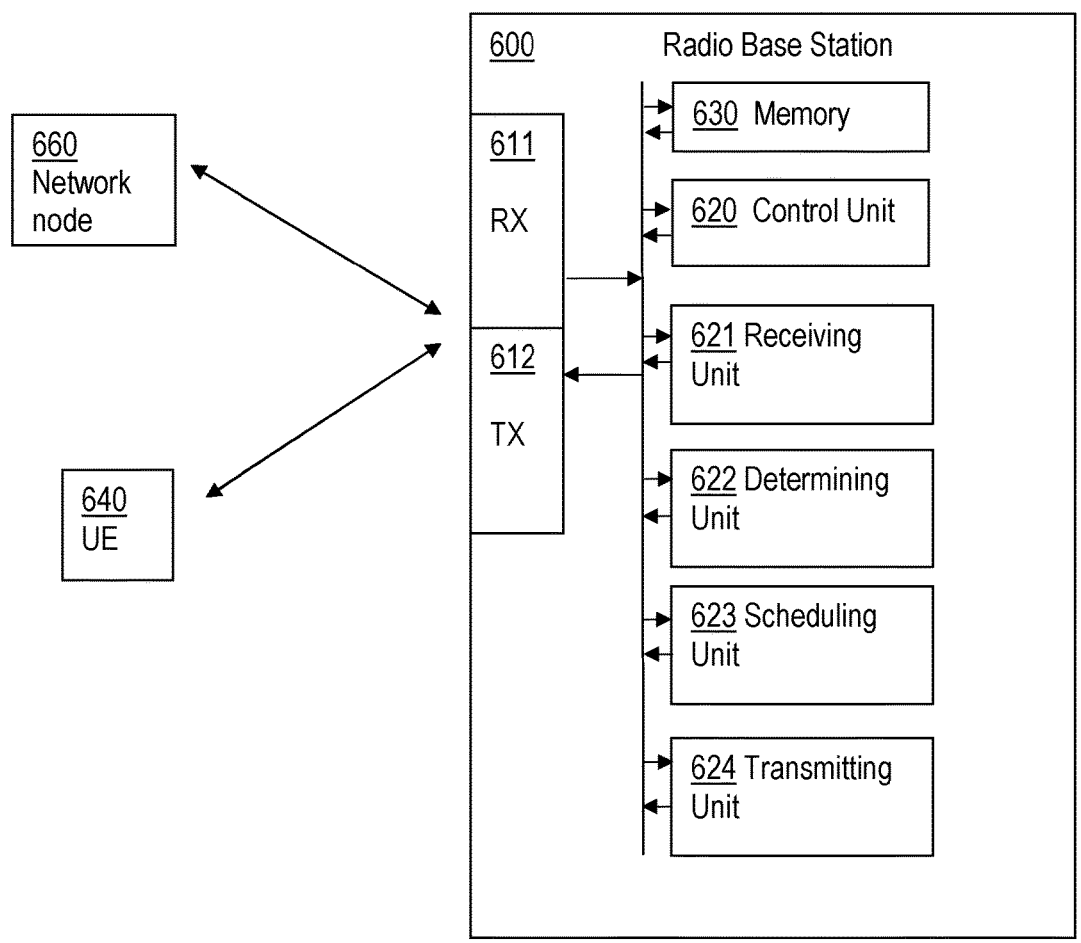
FIG. 6 is a block diagram of an RBS for transmitting control channels to UEs according to an exemplifying embodiment.

FIG. 6 is a block diagram of an RBS 600 adapted for transmitting control channels to UEs 640 according to an exemplifying embodiment. FIG. 6 illustrates the RBS 600 comprising a receiving unit 621 adapted to receive information from a network node regarding a number of, and which, subframes out of a predetermined number of subframes in which control channels are to be transmitted with reduced from the network node. The RBS 600 further comprises a determining unit 622 adapted to determine at least one UE 640 requiring the control channels to be sent with nominal transmission power, and a scheduling unit 623 adapted to schedule control channels, for the at least one UE 640, in subframes in which control channels are to be transmitted with reduced power from the network node.

The RBS has several advantages. For example, mechanisms are provided for control region interference mitigation. Further, the method and/or the RBS may be used in conjunction with currently standardised data region interference. Another advantage may be that peer-to-peer signalling may be used which enables full autonomy for the RBS to perform an internal evaluation of the best scheduling strategy for the UE(s). Still a possible advantage is that the solution is flexible enough to adapt to the variability of the control region duration in each subframe. The solution has no impact on the UEs hence the solution may be employed for all existing UEs.

According to an embodiment, the RBS 600 further comprises a transmitting unit 624 adapted to transmit, to the network node 660, a message indicating that the network node is causing interference to the at least one UE 640 currently being associated with the RBS.

According to still another embodiment, the RBS 600 further comprising a receiving unit 621 adapted to receive measurement reports from UEs 640 currently being associated with the RBS 600, wherein the at least one UE 640 is identified based on the received measurement reports.

The exemplifying embodiments described above may be employed in different networks, for example in a homogeneous radio communication network and in a heterogeneous radio communication network.

Figure 7:
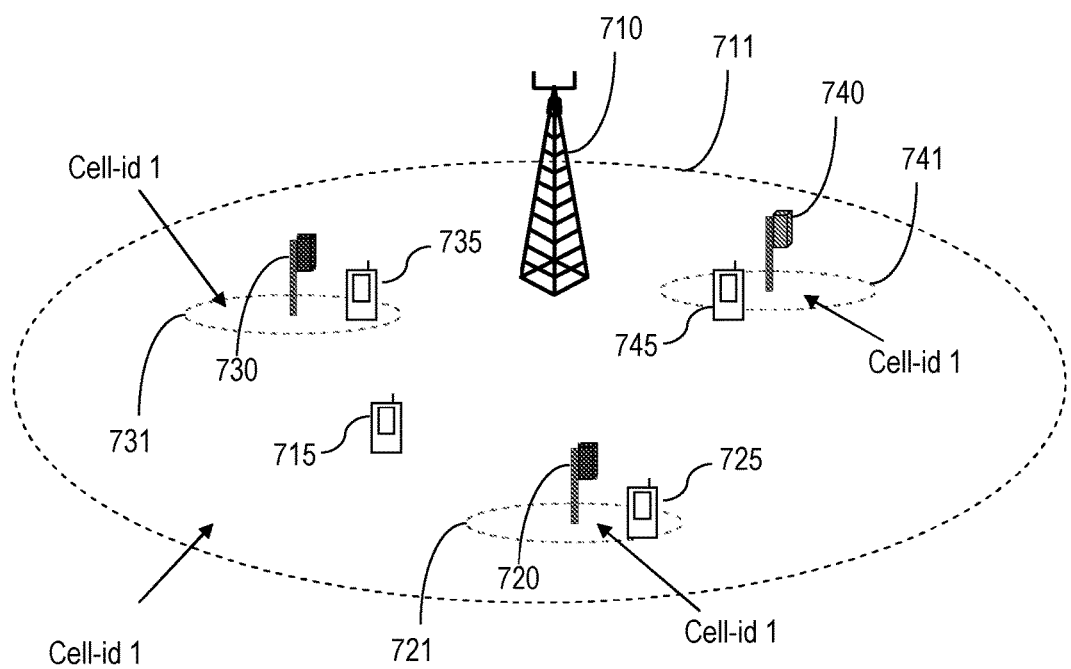
FIG. 7 is an illustration of an architectural overview of a heterogeneous communication system comprising a macro RBS and a three low power RBSs.
Figure 8:
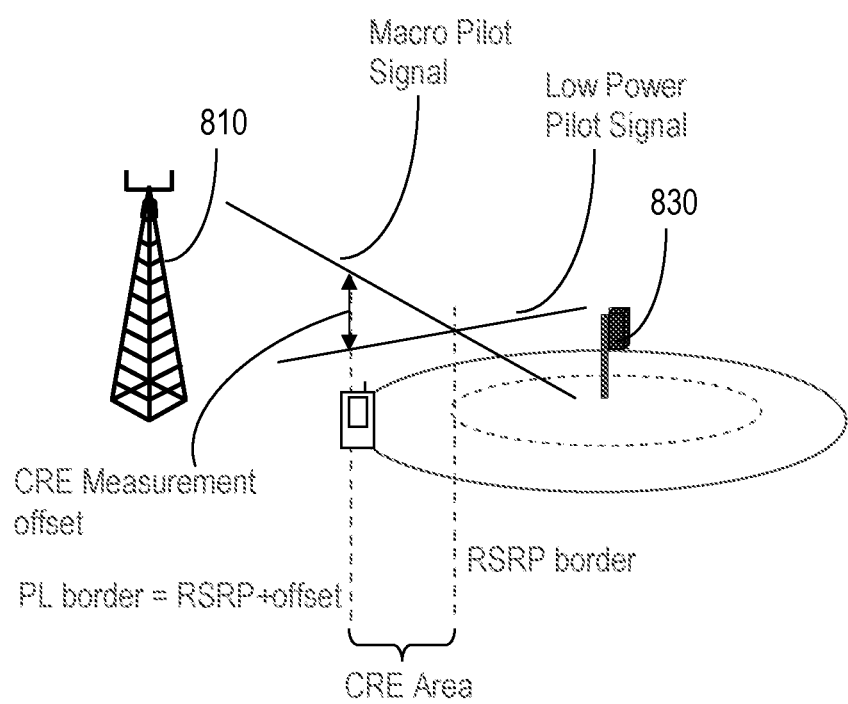
FIG. 8 is an illustration of a Cell Range Extension, CRE, area of a low power RBS.

Heterogeneous networks have recently attained large interest within the mobile cellular industry and are regarded as an important type of cellular deployments to meet high user experiences in mobile broadband. Heterogeneous networks can be characterized as deployments with a mixture of cells of differently sized and overlapping coverage areas, i.e. RBSs having different transmission powers. One example of such network is where low power RBSs are deployed within the coverage area of a macro RBS, as illustrated in FIGS. 7 and 8. A low power RBS is a small cellular base station transmitting with low output power and typically covers a much smaller geographical area than a macro base station. FIG. 7 illustrates a macro RBS 710 and low power RBSs 720, 730, 740. FIG. 8 illustrates a macro RBS 810 and a low power RBS 830.

Heterogeneous networks represent an alternative to densification of macro networks, and have classically been considered in cellular networks with traffic hotspots as a deployment for increasing network capacity. In such scenarios small cells, i.e. the coverage areas of low power RBSs, covering the traffic hotspot can off-load the macro RBS and thus improve both capacity and the overall data throughput within the coverage area of the macro RBS. In emerging mobile broadband applications, there is however a continuous demand for higher data rates and therefore it is of interest to deploy low power nodes or RBSs not necessarily to cover traffic hotspots only but also at locations within the macro cell coverage of the macro RBS where the signal-to-noise ratio prevents high data rates.

Since RBSs operate with different reference power levels, i.e. the macro and low power RBSs, there can be imbalances between uplink and downlink in the network. The reason is that RBSs or cells are typically selected by a UE based on received signal strength, which means that UEs are served by the best downlink RBS alternative. However, the uplink depends mainly on the distance between the UE and the serving RBS, i.e. independent of the reference power. This means that with RBS or cell selection based on the downlink reference, UEs may have a better uplink to a non-serving RBS. In such case, a different solution called Cell Range Extension, CRE, is used. According to such a solution, the UE is configured by the Macro RBS to be able to detect RBS or cells that are further away and that normally would not be detected. Typically, these RBSs comprise those with a reference signal lower than 6 dBs from the reference signal of the macro RBS, although detection for reference signals up to 9 dB lower than the serving reference signal may be possible. The extended area within which the UE can detect low power RBSs with reference signals below such threshold is called the CRE of the low power RBS. In order to detect neighbour RBSs with such reference signal strength, the UE will need to be configured by the macro RBS with a specific measurement offset, as illustrated in FIG. 5.

Once such RBSs are detected by the UE and reported to the macro RBS, the macro RBS can decide to handover the UE to the detected low power RBS. Such handover might be preceded by allocation of so called Almost Blank Subframes, ABS, by the macro RBS. ABSs are "protected subframes", namely subframes where the macro RBS limits its transmission. Therefore, a low power RBS neighbouring the macro RBS will experience reduced interference on such ABS subframes.

Once the UE, being located in the CRE, is handed over to the low power RBS, the low power RBS may decide to serve the UE on ABSs, due to the otherwise high DL interference the UE would experience from the macro RBS. Further, the UE should be configured by the low power RBS to measure neighbouring RBSs on ABSs. This will ensure that the measurements are not impacted by high levels of DL interference from the macro RBS.

A concept called Reduced Power SubFrames (RPSF) has been introduced and it consists of subframes where the macro RBS will schedule data traffic for UEs at a reduced transmission power. The RPSF concept differs from the ABS concept for the fact that no data traffic is supposed to be transmitted on ABS subframes, although the latter is not mandated by standardization. The RSRP concept only affects the data traffic as the data signals for UEs are transmitted at a reduced transmission power.

Figure 9:
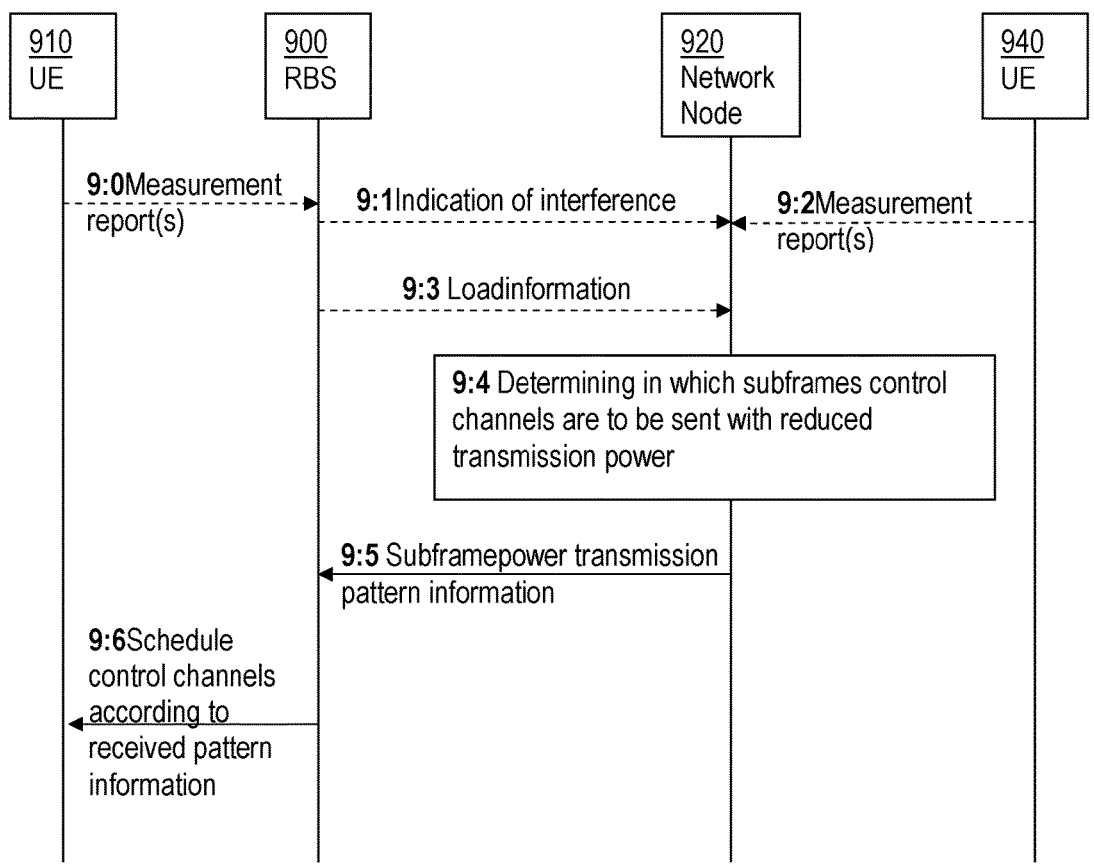
FIG. 9 is a signalling diagram of a procedure for protecting control channels of a neighbouring RBS according to an exemplifying embodiment.

FIG. 9 is a signalling diagram of a procedure for protecting control channels of a neighbouring RBS according to an exemplifying embodiment.

In this example, the RBS 900 receives an indication, e.g. by means of measurement reports 9:0, that at least one of the UEs 910 which are currently being served by the RBS is experiencing interference from the network node 920. The RBS 900 transmits an indication to the network node 920 to make the network node become aware of the fact that the network node is causing interference to at least one UE served by its neighbouring RBS. This is illustrated in FIG. 9 by the RBS 900 sending a 9:1 Indication of interference.

The network node 920 may in this example also receive an indication, e.g. by means of measurement reports, that at least one of the UEs which are currently being served by the network node is experiencing relatively good channel quality such that the UE does not require control signals to be sent with nominal transmission power. This is illustrated in FIG. 9 by the UE 940 sending a 9:2 Measurement report(s).

The RBS 900 further provides the network node with information pertaining to a current load situation of the RBS, illustrated by the RBS 900 sending a 9:3 Load information to the network node 920.

The network node 920 then determines in an action 9:4 in which subframes out of predetermined subframes control channels are to be sent with reduced transmission power.

Thereafter, the network node 920 informs the RBS 900 about which subframe(s) out of the predetermined number of subframes in which control channels are to be transmitted with reduced transmission power. This is illustrated in FIG. 9 by the network node sending a 9:5 Subframe power transmission pattern information.

Once the RBS 900 is aware of which subframes in which control channels are to be transmitted with reduced transmission power from the network node, the RBS 900 may schedule control channels to the UE 910 experience interference from the network node 920 according to the received pattern; illustrated by the RBS 900 sending 9:6 Schedule control channels according to received pattern information.

Figure 10:
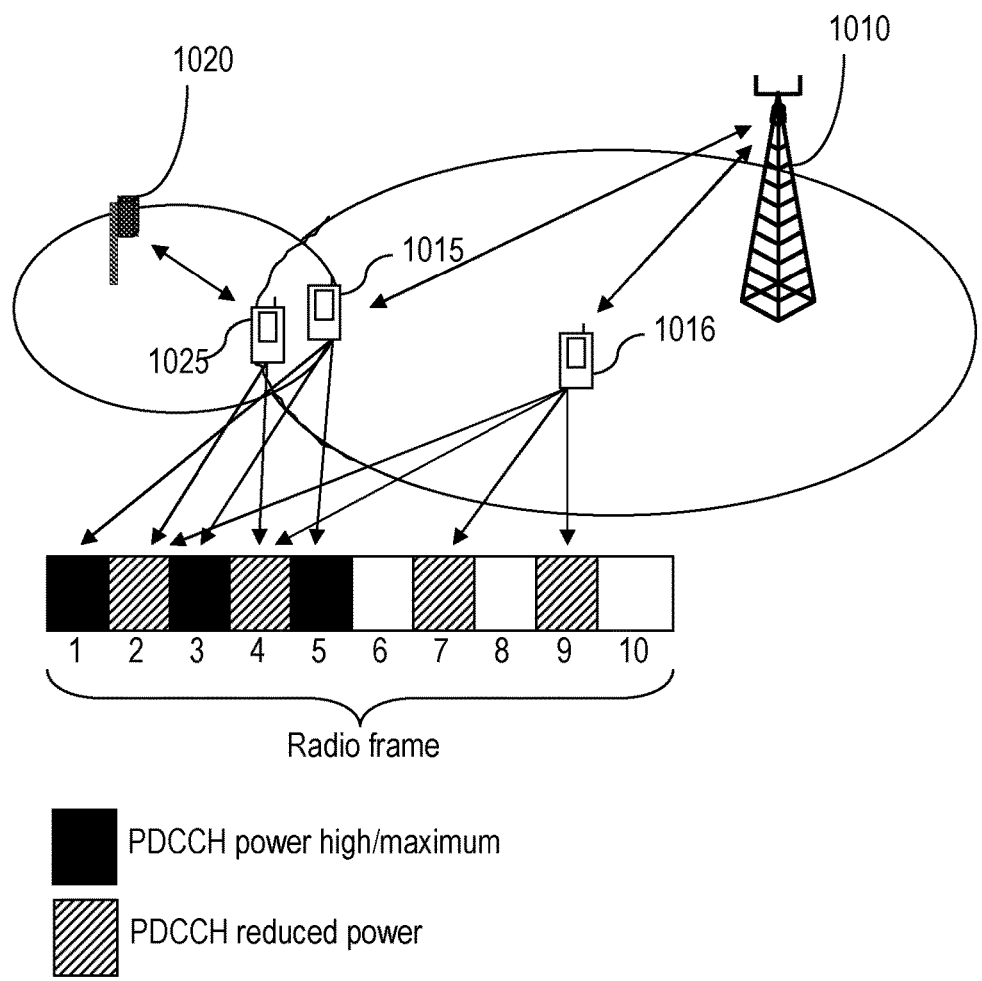
FIG. 10 is an illustration of an example of control channel scheduling in time domain resources between a network node and an RBS.

FIG. 10 is an illustration of an example of control channel scheduling in time domain resources between a network node and an RBS. In this example, it is assumed that the network node 1010, which may e.g. be a macro RBS, has sent information to the RBS 1020, which may e.g. be a low power RBS, regarding which subframes in which control channels are to be transmitted with reduced transmission power from the network node 1010.

FIG. 10 illustrates the RBS 1020 serving a UE 1025 and the network node 1010 serving UEs 1015 and 1016. From the network node's 1010 point of view, UE 1015 is further away from the network node than UE 1016 and hence UE 1015 requires control channels to be transmitted with nominal transmission power in order for the UE 1015 to receive them. On the other hand, UE 1016 is closer and does not require control channels to be transmitted with nominal transmission power in order for the UE 1016 to receive them.

FIG. 10 illustrates the RBS 1012 scheduling its UE 1025 in subframes 2 and 4 which have been indicated by the network node to be subframes in which the network node will transmit control channels with reduced transmission power. In this manner, the network node 1010 will cause minimum, if any, interference with regards to control channels for UE 1025. Since UE 1016 does not require control channels to be transmitted with nominal transmission power in order for the UE 1016 to receive them, the network node schedules UE 1016 in subframes 2, 4, 7 and 9. The network node 1010 also schedules the UE 1015 in subframes 1, 3 and 5 in which control channels are transmitted with nominal transmission power. Although not illustrated in FIG. 10, the RBS 1020 may schedule a UE being located close to the RBS 1020 in subframes 1, 3 and 5 since that UE may possible not experience as much interference from the network node 1010 as UE 1025 does. A UE being closer to the RBS 1020 is likely to be further away from the network node 1010 than UE 1025 is.

In FIGS. 5 and 6, the network node 500 and the RBS 600 are respectively illustrated comprising a receiving unit 511, 611 and a transmitting unit 512, 612. Through these two units, the network node 500 and the RBS 600 are respectively adapted to communicate with other nodes and/or entities in the wireless communication network. The receiving unit 511, 611 may comprise more than one receiving arrangement. For example, the receiving unit may be connected to both a wire and an antenna, by means of which the network node 500 and the RBS 600 are enabled to communicate with other nodes and/or entities in the wireless communication network. Similarly, the transmitting unit 512, 612 may comprise more than one transmitting arrangement, which in turn are connected to both a wire and an antenna, by means of which the network node 500 and the RBS 600 are enabled to communicate with other nodes and/or entities in the wireless communication network. The network node 500 and the RBS 600 further respectively comprise a memory 530, 630 for storing data. Further, network node 500 and the RBS 600 are illustrated comprising a control unit 520, 620 which in turns are connected to different modules 521-525 and 621-624 respectively. It shall be pointed out that this is merely illustrative examples and the network node 500 and the RBS 600 may comprise more, less or other units or modules which execute the functions of the network node 500 and the RBS 600 in the same manner as the units illustrated in FIGS. 5 and 6.

It should be noted that FIGS. 5 and 6 merely illustrates various functional units in the network node 500 and the RBS 600 in a logical sense. The functions in practice may be implemented using any suitable software and hardware means/circuits etc. Thus, the embodiments are generally not limited to the shown structures of the network node 500 and the RBS 600 and the functional units. Hence, the previously described exemplary embodiments may be realised in many ways. For example, one respective embodiment of the network node 500 and the RBS 600 includes a computer-readable medium having instructions stored thereon that are executable by the control unit for executing the method steps in the network node 500 and the RBS 600. The instructions executable by the computing system and stored on the computer-readable medium perform the method steps of the network node 500 and the RBS 600 as set forth in the claims.

Figure 11:
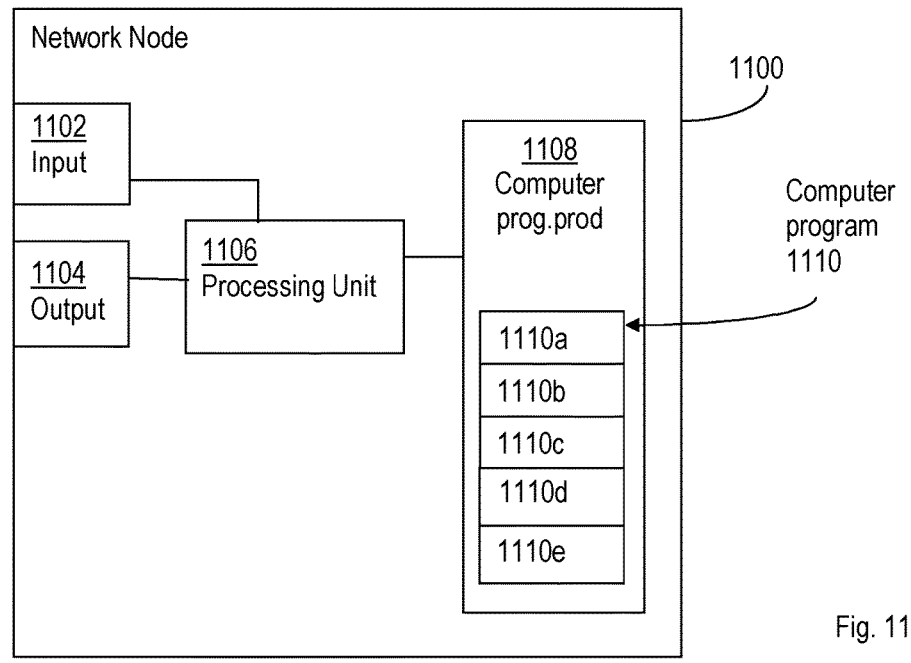
FIG. 11 schematically shows an embodiment of a network node adapted for protecting control channels of a neighbouring RBS.

FIG. 11 schematically shows an embodiment of a network node 1100. Comprised in the network node 1100 are here a processing unit 1106, e.g. with a DSP (Digital Signal Processor). The processing unit 1106 may be a single unit or a plurality of units to perform different actions of procedures described herein. The network node 1100 may also comprise an input unit 1102 for receiving signals from other entities, and an output unit 1104 for providing signal(s) to other entities. The input unit 1102 and the output unit 1104 may be arranged as an integrated entity or as illustrated in the example of FIG. 5, as one or more interfaces 511, 512.

Furthermore, the network node 1100 comprises at least one computer program product 1108 in the form of a non-volatile memory, e.g. an EEPROM (Electrically Erasable Programmable Read-Only Memory), a flash memory and a hard drive. The computer program product 1108 comprises a computer program 1110, which comprises code means, which when executed in the processing unit 1106 in the network node 1100 causes the network node 1100 to perform the actions e.g. of the procedure described earlier in conjunction with FIGS. 2a-2c.

The computer program 1110 may be configured as a computer program code structured in computer program modules. Hence, in an exemplifying embodiment, the code means in the computer program of the network node 1100 comprises a determining unit 1110a for determining at least one subframe out of a predetermined number of subframes in which control channels are to be transmitted with reduced transmission power in relation to a nominal transmission power. The computer program further comprises an informing unit 1110b for informing the RBS which subframe(s) out of the predetermined number of subframes in which control channels are to be transmitted with reduced transmission power.

The computer program modules could essentially perform the actions of the flow illustrated in FIGS. 2a-2c, to emulate the network node 1100. In other words, when the different computer program modules are executed in the processing unit 1106, they may correspond to the units 521-525 of FIG. 5.

Although the code means in the embodiment disclosed above in conjunction with FIGS. 5 and 11 are implemented as computer program modules which when executed in the processing unit 1106 causes the network node 1100 to perform the actions described above in the conjunction with figures mentioned above, at least one of the code means may in alternative embodiments be implemented at least partly as hardware circuits.

Figure 12:
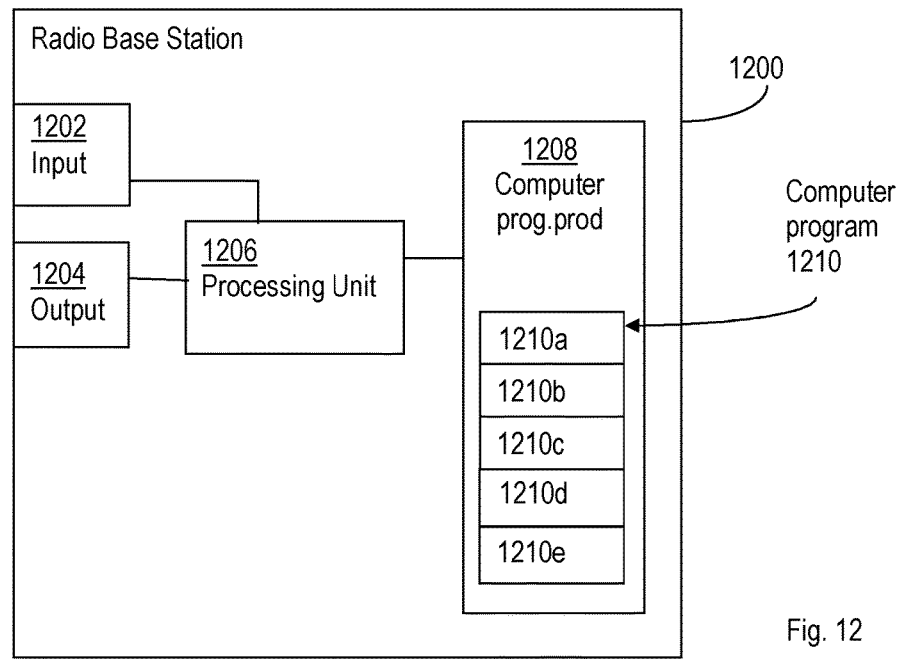
FIG. 12 schematically shows an embodiment of an RBS adapted for transmitting control channels to UEs.

FIG. 12 schematically shows an embodiment of an RBS 1200. Comprised in the RBS 1200 are here a processing unit 1206, e.g. with a DSP (Digital Signal Processor). The processing unit 1206 may be a single unit or a plurality of units to perform different actions of procedures described herein. The RBS 1200 may also comprise an input unit 1202 for receiving signals from other entities, and an output unit 1204 for providing signal(s) to other entities. The input unit 1202 and the output unit 1204 may be arranged as an integrated entity or as illustrated in the example of FIG. 6, as one or more interfaces 611, 612.

Furthermore, the RBS 1200 comprises at least one computer program product 1208 in the form of a non-volatile memory, e.g. an EEPROM (Electrically Erasable Programmable Read-Only Memory), a flash memory and a hard drive. The computer program product 1208 comprises a computer program 1210, which comprises code means, which when executed in the processing unit 1206 in the RBS 1200 causes the RBS 1200 to perform the actions e.g. of the procedure described earlier in conjunction with FIGS. 4a-4b.

The computer program 1210 may be configured as a computer program code structured in computer program modules. Hence, in an exemplifying embodiment, the code means in the computer program of the RBS 1200 comprises a receiving unit for receiving information from a network node regarding a number of, and which, subframes out of a predetermined number of subframes in which control channels are to be transmitted with reduced from the network node. The computer program further comprises a determining unit for determining at least one UE requiring the control channels to be sent with nominal transmission power, and a scheduling unit for scheduling control channels, for the at least one UE, in subframes in which control channels are to be transmitted with reduced power from the network node.

Figure 4B:
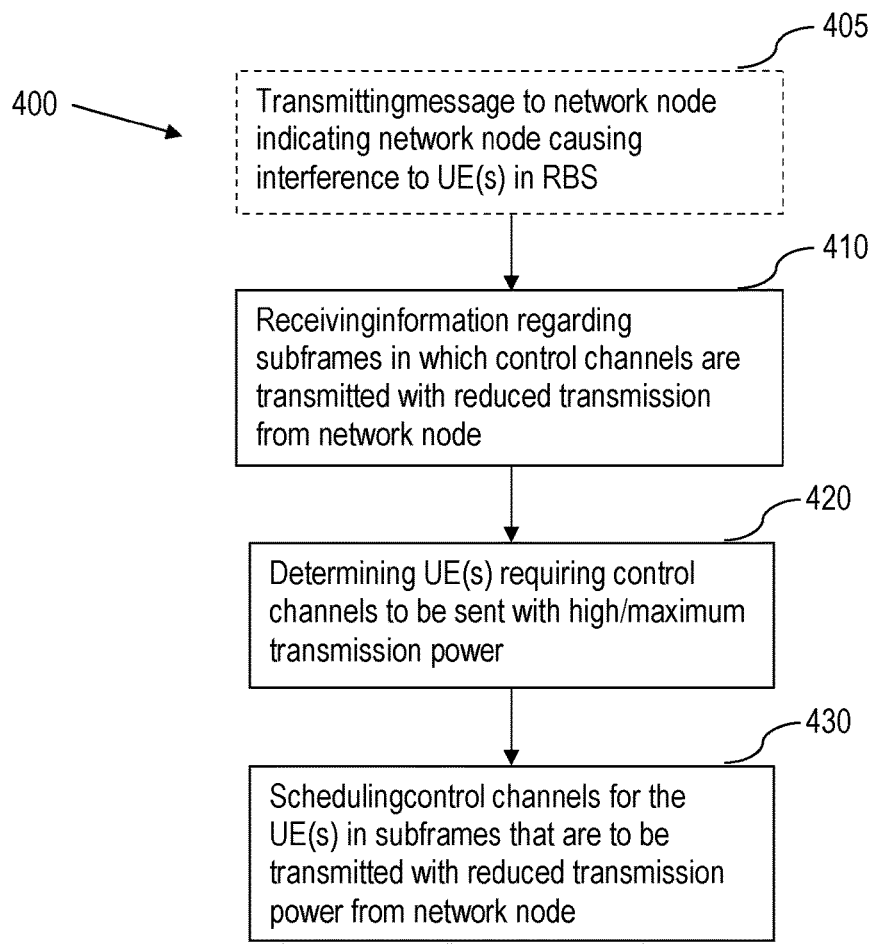
FIG. 4b is a flowchart of a method in an RBS for transmitting control channels to UEs according to another exemplifying embodiment.

The computer program modules could essentially perform the actions of the flow illustrated in FIGS. 4a-4b, to emulate the RBS 1200. In other words, when the different computer program modules are executed in the processing unit 1206, they may correspond to the units 621-624 of FIG. 6.

Although the code means in the embodiment disclosed above in conjunction with FIGS. 6 and 12 are implemented as computer program modules which when executed in the processing unit 1206 causes the RBS 1200 to perform the actions described above in the conjunction with figures mentioned above, at least one of the code means may in alternative embodiments be implemented at least partly as hardware circuits.

The respective processor of the network node and the RBS may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer: readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the power management module 300.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node for protecting control channels of a neighbouring Radio Base Station, RBS, the network node and the RBS being operable in an Orthogonal Frequency Division Multiplexing, OFDM, based radio communication network, the method comprising:
   selecting at least one subframe out of a predetermined number of subframes, in which the network node will transmit control channels with reduced transmission power in relation to a nominal transmission power; and
   indicating the selected subframes to the neighbouring RBS
   wherein the network node performs the selecting step independently from determining in which subframe(s) data channels are to be transmitted by the network node with reduced transmission power; and
   wherein the method further comprises performing said selecting and indicating steps as a response to receiving indications from User Equipments, UEs, currently being associated with the network node, said indications indicating at least one UE requiring the control channels to be transmitted by the network node with the nominal transmission power and indicating at least one UE not requiring the control channels to be transmitted by the network node with the nominal transmission power.

2. The method according to claim 1, wherein the control channels to be transmitted with reduced transmission power are Physical Layer Downlink Control Channels, related to scheduling of UE specific data, and wherein control channels relating to system information are transmitted with the nominal transmission power.

3. The method according to claim 1, wherein indicating the selected subframes to the neighbouring RBS comprises indicating the amount of power reduction with which the control channels are to be transmitted by the network node.

4. The method according to claim 1, wherein indicating the selected subframes to the neighbouring RBS comprises sending the indication by means of an X2 interface that communicatively couples the network node and the neighbouring RBS.

5. The method according to claim 1, further comprising performing the selecting and indicating steps responsive to the network node receiving a message from the neighbouring RBS, indicating that the network node is causing interference to at least one UE currently associated with the neighbouring RBS.

6. The method according to claim 5, wherein the received message is an X2 LOAD INFORMATION message comprising an Information Element indicating a request for reduced control channel power transmission.

7. The method according to claim 1, further comprising scheduling control channels in the subframes in which the control channels are transmitted with the nominal power for the at least one UE requiring the control channels to be sent with the nominal transmission power and scheduling control channels in the subframes in which control channels are transmitted with reduced power for the at least one UE not requiring the control channels to be sent with the nominal transmission power.

8. The method according to claim 1, wherein selecting which subframes out of the predetermined number of subframes, during which the network node will transmit control channels with reduced power is at least partly based on a current load for the network node, said load relating to at least one of traffic and interference levels at the network node operating as a RBS within the OFDM based radio communication network.

9. The method according to claim 1, wherein selecting which subframes out of the predetermined number of subframes, during which the network node will transmit control channels with reduced power is at least partly based on a current load for the neighbouring RBS, said load relating to at least one of traffic and interference levels at the neighbouring RBS.

10. The method according to claim 1, further comprising determining an individual transmission power level for each of the selected subframes, from among a plurality of individual power levels into which the reduced transmission power is differentiated.

11. The method according to claim 1, further comprising determining a length of a control region of individual subframes of the predetermined number of subframes, wherein the length of the control region is one of 1, 2 or 3 OFDM symbols, the method further comprising informing the neighbouring RBS of the determined length of the control region of the individual subframes of the predetermined number of subframes by means of an X2 interface.

12. The method according to claim 1, further comprising determining a length of a control region of the predetermined number of subframes, wherein the length of the control region is one of 1, 2 or 3 OFDM symbols, all the subframes of the predetermined number of subframes having the same control region length, the method further comprising informing the neighbouring RBS of the determined length of the control region of the predetermined number of subframes.

13. The method according to claim 1, further comprising, for the selected subframes, determining to transmit the first three OFDM symbols in each selected subframe with reduced transmission power and informing the neighbouring RBS about the determination.

14. The method according to claim 1, wherein the predetermined number of subframes is 40, wherein each subframe is 1 ms long.

15. A network node configured to protect control channels of a neighbouring Radio Base Station, RBS, the network node and the RBS being configured for operation in an Orthogonal Frequency Division Multiplexing, OFDM, based radio communication network, the network node comprising:
a communication interface configured for communicating with the neighbouring RBS; and
processing circuitry associated with the communication interface and configured to:
select at least one subframe out of a predetermined number of subframes, in which the network node will transmit control channels with reduced transmission power in relation to a nominal transmission power; and
indicate the selected subframes to the neighbouring RBS, via the communication interface;
wherein the processing circuitry is configured to select the at least one subframe independently of in which subframe(s) data channels are to be transmitted by the network node with reduced transmission power; and
wherein the processing circuitry is configured to select the at least one subframe as a response to the network node receiving indications from User Equipments, UEs, currently associated with the network node, said indications indicating at least one of the UEs requires the control channels to be sent by the network node with the nominal transmission power and indicating at least one of the UEs does not require the control channels to be sent by the network node with the nominal transmission power.

16. The network node according to claim 15, wherein the control channels to be transmitted with reduced transmission power are Physical Layer Downlink Control Channels, related to scheduling of UE specific data, wherein control channels relating to system information are transmitted with the nominal transmission power.

17. The network node according to claim 15, wherein the processing circuitry is configured to indicate to the neighbouring RBS the amount of power reduction.

18. The network node according to claim 15, wherein the communication interface comprises an X2 interface.

19. The network node according to claim 15, wherein the processing circuitry is configured to select the at least one subframe in response to receiving a message from the neighbouring RBS indicating that the network node is causing interference to at least one UE currently associated with the neighbouring RBS.

20. The network node according to claim 19, wherein the received message is received via an X2 interface of the network node, as said communication interface, and comprises an X2 LOAD INFORMATION message comprising an Information Element indicating a request for reduced control channel power transmission.

21. The network node according to claim 15, wherein the processing circuitry is further configured to schedule control channels in the subframes in which the control channels are transmitted with the nominal transmission power, for the at least one of the UEs that requires the control channels to be sent with the nominal transmission power, and to schedule control channels in the subframes in which control channels are transmitted with reduced power, for the at least one of the UEs that does not require the control channels to be sent with the nominal transmission power.

22. The network node according to claim 15, wherein the processing circuitry is configured to select the at least one subframe at least partly based on a current load for the network node, said load relating to at least one of traffic and interference levels at the network node operating as a RBS within the OFDM based radio communication network.

23. The network node according to claim 15, wherein the processing circuitry is configured to select the at least one subframe at least partly based on a current load for the neighbouring RBS, said load relating to at least one of traffic and interference levels at the neighbouring RBS.

24. The network node according to claim 15, wherein the processing circuitry is configured to determine an individual transmission power level for each of the selected subframes, from among a plurality of individual power levels into which the reduced transmission power is differentiated.

25. The network node according to claim 15, wherein the processing circuitry is configured to determine a length of a control region of individual subframes of the predetermined number of subframes, wherein the length of the control region is one of 1, 2 or 3 OFDM symbols, wherein the processing circuitry is configured to inform the neighbouring RBS of the determined length of the control region of the individual subframes of the predetermined number of subframes via an X2 interface, as said communication interface.

26. The network node according to claim 15, wherein the processing circuitry is configured to determine a length of a control region of the predetermined number of subframes, wherein the length of the control region is one of 1, 2 or 3 OFDM symbols, all the subframes of the predetermined number of subframes having the same control region length, wherein the processing circuitry is configured to inform the neighbouring RBS of the determined length of the control region of the predetermined number of subframes.

27. The network node according to claim 15, wherein, for the selected subframes, the processing circuitry is configured to determine to transmit the first three OFDM symbols with reduced transmission power and to inform the neighbouring RBS regarding the determination.

28. A non-transitory computer readable medium storing a computer program comprising computer program instructions that, when executed by processing circuitry in a network node, configures the network node to protect control channels of a neighbouring Radio Base Station, RBS, wherein the network node and the RBS are operable in an Orthogonal Frequency Division Multiplexing, OFDM, based radio communication network, and wherein the computer program comprises computer program instructions that configure the network node to:
    select at least one subframe out of a predetermined number of subframes, in which the network node will transmit control channels with reduced transmission power in relation to a nominal transmission power; and
    indicate the selected subframes to the neighbouring RBS;
wherein execution of the computer program by the processing circuitry configures the processing circuitry to:
    select the at least one subframe independently from determining in which subframe(s) data channels are to be transmitted by the network node with reduced transmission power; and
    select the at least one subframe as a response to the network node receiving indications from User Equipments, UEs, currently associated with the network node, said indications indicating at least one of the UEs requires the control channels to be sent by the network node with the nominal transmission power and indicating at least one of the UEs does not require the control channels to be sent by the network node with the nominal transmission power.

\* \* \* \* \*

UNITED STATES PATENT AND TRADEMARK OFFICE
CERTIFICATE OF CORRECTION

PATENT NO. : 9,614,630 B2  
APPLICATION NO. : 14/440758  
DATED : April 4, 2017  
INVENTOR(S) : Teyeb et al.

Page 1 of 2

It is certified that error appears in the above-identified patent and that said Letters Patent is hereby corrected as shown below:

On the Title Page

Item (56), under "U.S. PATENT DOCUMENTS", in Column 2, Line 1, delete "Fong" and insert -- Fong et al. --, therefor.

Item (56), under "U.S. PATENT DOCUMENTS", in Column 2, Line 3, delete "Ji" and insert -- Ji et al. --, therefor.

Item (56), under "U.S. PATENT DOCUMENTS", in Column 2, Line 3, delete "Ratasuk" and insert -- Ratasuk et al. --, therefor.

In the Drawings

Fig. 2c, Sheet 4 of 14, for Step "210", in Line 1, delete "with for" and insert -- with --, therefor.

In the Specification

Column 2, Line 57, delete "Noise" and insert -- Plus Noise --, therefor.

Column 4, Line 16, delete "mechanisms" and insert -- mechanism --, therefor.

Column 11, Line 14, delete "Information," and insert -- Indicator, --, therefor.

Column 11, Line 27, delete "MCSs," and insert -- MSCs, --, therefor.

Column 24, Line 28, delete "illustrates" and insert -- illustrate --, therefor.

Column 26, Line 17, delete "computer: readable" and insert -- computer-readable --, therefor.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,614,630 B2

In the Claims

Column 26, Line 56, in Claim 1, delete "RBS" and insert -- RBS; --, therefor.